(12) United States Patent
Kim et al.

(10) Patent No.: US 12,742,996 B2
(45) Date of Patent: Sep. 22, 2026

(54) BEAM SCANNING DEVICE AND SCANNING METHOD THEREOF

(71) Applicant: Samsung Electronics Co., Ltd., Suwon-si (KR)

(72) Inventors: Young Kim, Suwon-si (KR); Junghyun Park, Suwon-si (KR); Sunil Kim, Suwon-si (KR); Minkyung Lee, Suwon-si (KR); Byunggil Jeong, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 290 days.

(21) Appl. No.: 18/583,161

(22) Filed: Feb. 21, 2024

(65) Prior Publication Data

US 2025/0116911 A1 Apr. 10, 2025

(30) Foreign Application Priority Data

Oct. 10, 2023 (KR) ........................ 10-2023-0134328

(51) Int. Cl.
*G02F 1/31* (2006.01)

(52) U.S. Cl.
CPC ...................................... *G02F 1/31* (2013.01)

(58) Field of Classification Search
CPC ......... G02F 1/31; G02F 1/292; G02B 26/002; G02B 26/0816; G02B 26/101; G01S 7/4817; G01S 17/931
USPC ........................................................ 359/315
See application file for complete search history.

(56) References Cited

U.S. PATENT DOCUMENTS

| | | | | |
|---|---|---|---|---|
| 8,081,364 B2 * | 12/2011 | Kim | G02B 26/101 | 359/208.1 |
| 9,098,831 B1 | 8/2015 | Miles et al. | | |
| 9,098,931 B2 | 8/2015 | Shpunt et al. | | |
| 10,983,197 B1 | 4/2021 | Zhu et al. | | |
| 11,256,081 B2 * | 2/2022 | Park | G01S 7/4817 | |
| 11,435,571 B2 * | 9/2022 | Inada | G02B 6/12 | |
| 2009/0135460 A1 * | 5/2009 | Kim | G02B 26/101 | 359/201.1 |

(Continued)

FOREIGN PATENT DOCUMENTS

| | | |
|---|---|---|
| CN | 115792856 A | 3/2023 |
| KR | 10-2018-0028791 A | 3/2018 |
| KR | 10-2023-0067621 A | 5/2023 |

OTHER PUBLICATIONS

Federica Villa et al., "SPADs and SiPMs Arrays for Long-Range High-Speed Light Detection and Ranging (LiDAR)", Sensors, 21(11), 3839 (2021).

*Primary Examiner* — William R Alexander
(74) *Attorney, Agent, or Firm* — Harness, Dickey & Pierce, P.L.C.

(57) ABSTRACT

A beam scanning device includes a light modulation array and a processor. The light modulation array is configured to scan an external space based on phase modulating a plurality of light beams and, in a state in which the plurality of light beams are arranged in a first direction, sequentially steering the plurality of light beams in a second direction different from the first direction. The processor is configured to control the light modulation array to cause a degree of steering shift of the light modulation array to vary depending on whether a region of interest is located in the external space.

18 Claims, 22 Drawing Sheets

(56) References Cited

U.S. PATENT DOCUMENTS

| | | | | |
|---|---|---|---|---|
| 2018/0074382 | A1 | 3/2018 | Lee et al. | |
| 2019/0146209 | A1* | 5/2019 | Inada | G02B 26/101 385/25 |
| 2020/0162722 | A1* | 5/2020 | Hall | G02B 26/0808 |
| 2020/0183148 | A1* | 6/2020 | Park | G02B 26/06 |
| 2020/0333588 | A1* | 10/2020 | Inada | G01S 7/4818 |
| 2022/0276345 | A1 | 9/2022 | Eshel et al. | |

* cited by examiner i ii i ii

BEAM SCANNING DEVICE AND SCANNING METHOD THEREOF

CROSS-REFERENCE TO RELATED APPLICATION

This application is based on and claims priority under 35 U.S.C. § 119 to Korean Patent Application No. 10-2023-0134328, filed on Oct. 10, 2023, in the Korean Intellectual Property Office, the disclosure of which is incorporated by reference herein in its entirety.

BACKGROUND

1. Field

The inventive concepts relate to beam scanning devices and beam scanning methods of the beam scanning devices, and more particularly, to non-mechanical beam scanning devices, beam scanning methods of the non-mechanical beam scanning devices, and electronic devices including the non-mechanical beam scanning devices.

2. Description of the Related Art

Advanced driving assistance systems (ADASs) having various functions have been commercialized. For example, an increasing number of vehicles are equipped with features such as: an autonomous adaptive cruise control (ACC) function of detecting the positions and speeds of other vehicles for decreasing the speed of a vehicle when there is a risk of collision and maintaining the speed of the vehicle within a set speed range when there is no risk of collision; and an autonomous emergency braking (AEB) system for preventing accidents by automatically breaking a vehicle when the driver of the vehicle does not respond or properly respond to a risk of collision with another vehicle that is detected ahead of the vehicle. In addition, it is expected that vehicles capable of autonomous driving will be commercialized in the near future.

Therefore, there is increasing interest in optical sensing devices capable of providing information about the surroundings of a vehicle. For example, an automotive light detection and ranging (LiDAR) device may emit a laser light beam to a selected region around a vehicle and may detect the laser light beam reflected from the selected region to provide the vehicle with information such as the distance to an object located in the selected region, the speed of the object relative to the speed of the vehicle, and the angle of the object from the vehicle. To this end, such automotive LiDAR devices require a beam steering technique for steering light to a desired region.

Beam steering methods may largely include a mechanical beam steering method and a non-mechanical beam steering method. Examples of the mechanical beam steering method may include a method of rotating a light source, a method of rotating a mirror that reflects light, and a method of moving a spherical lens in a direction perpendicular to an optical axis. In addition, examples of the non-mechanical beam steering method may include a method of using a semiconductor layer and a method of electrically controlling the angle of reflected light by using a reflective phased array.

SUMMARY

Some example embodiments provide a beam scanning device for scanning an external space by a non-mechanical steering method. Some example embodiments provide a beam scanning method of the beam scanning device.

Some example embodiments provide a beam scanning device for scanning an external space based on selectively adjusting a degree of steering shift depending on whether the external space is a region of interest or a region of non-interest. Some example embodiments provide a beam scanning method of the beam scanning device.

Some example embodiments provide a beam scanning device for scanning an external space based on selectively adjusting the intensity of light emitted to the external space according to whether the external space is a region containing an object or a region containing no object. Some example embodiments provide a beam scanning method of the beam scanning device.

Additional aspects will be set forth in part in the description which follows and, in part, will be apparent from the description, or may be learned by practice of the presented embodiments of the inventive concepts.

According to some example embodiments of the inventive concepts, there is provided a beam scanning device that may include a light modulation array and a processor. The light modulation array may be configured to scan an external space based on phase modulating a plurality of light beams and, in a state in which the plurality of light beams are arranged in a first direction, sequentially steering the plurality of light beams in a second direction different from the first direction. The processor may be configured to control the light modulation array to cause a degree of steering shift of the light modulation array to vary depending on whether a region of interest is determined to be located in the external space.

The processor may be further configured to, based on the light modulation array scanning the region of interest in the external space, control the light modulation array to perform the steering with a first degree of steering shift, and the processor may be further configured to, based on the light modulation array scanning a region of non-interest that is a region in the external space other than the region of interest, control the light modulation array to perform the steering with a second degree of steering shift that is greater than the first degree of steering shift.

The first degree of steering shift may be less than or equal to 0.8 times the second degree of steering shift.

The second degree of steering shift may be proportional to a proportion of the region of interest in the external space.

The region of interest in the external space may include at least one of a region containing an object or a region within a user's field of view.

The processor may be further configured to control the light modulation array to first scan the region of interest in the external space and later scan a region of non-interest that is a region in the external space other than the region of interest subsequently to scanning the region of interest.

The processor may be further configured to, based on a plurality of regions of interest being determined to be in the external space, control the light modulation array to cause the degree of steering shift to vary according to information associated with depths of the plurality of regions of interest.

The processor may be further configured to control the light modulation array to cause a degree of steering shift for a region of interest associated with small-depth information among the plurality of regions of interest to be less than a degree of steering shift for a region of interest associated with large-depth information among the plurality of regions of interest.

The light modulation array may be further configured to simultaneously steer the plurality of light beams in a same direction.

The beam scanning device may further include a light source array configured to emit the plurality of light beams to the light modulation array, wherein the processor may be further configured to control the light source array to cause an intensity of light for scanning the external space to vary depending on whether there is an object in the external space.

The processor may be further configured to control the light source array to cause a light intensity for scanning a region containing an object in the external space to be less than a light intensity for scanning a region containing no object in the external space.

A plurality of light sources included in the light source array may correspond in a one-to-one manner to a plurality of spatial light modulators included in the light modulation array.

The beam scanning device may further include a light detector configured to detect light reflected from the external space, wherein the processor may be further configured to obtain a frame including depth information based on using results detected by the light detector.

The processor may be further configured to determine the region of interest in the external space based on using the frame.

At least one spatial light modulator of a plurality of spatial light modulators included in the light modulation array may be configured to modulate, based on a sawtooth phase profile of an electronic signal applied to the at least one spatial light modulator, a phase of light.

According to some example embodiments of the inventive concepts, there is provided a beam scanning method. The beam scanning method includes emitting a plurality of light beams to a light modulation array, and scanning an external space by phase modulating the plurality of light beams and, in a state in which the plurality of light beams are arranged in a first direction, sequentially steering the plurality of lights in a second direction different from the first direction. In the scanning of the external space, the external space is scanned with a degree of steering shift varying depending on whether there is a region of interest in the external space.

In the scanning of the external space, a first degree of steering shift for the region of interest in the external space may be less than a second degree of steering shift for a region of non-interest that is a region in the external space other than the region of interest.

The second degree of steering shift may be proportional to a proportion of the region of interest in the external space.

The region of interest in the external space may include at least one of a region containing an object or a region within a user's field of view.

In the scanning of the external space, the region of interest in the external space may be first scanned, and a region of non-interest that is a region in the external space other than the region of interest may later be scanned subsequently to scanning the region of interest.

BRIEF DESCRIPTION OF THE DRAWINGS

The above and other aspects, features, and advantages of certain embodiments of the inventive concepts will be more apparent from the following description taken in conjunction with the accompanying drawings, in which.

DETAILED DESCRIPTION

Figure 1:
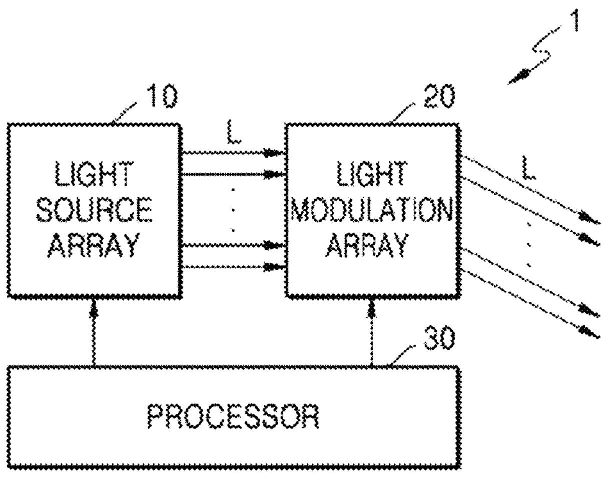
FIG. 1 is a block diagram illustrating a beam scanning device configured to scan an external space with a plurality of light beams, according to some example embodiments.

Reference will now be made in detail to example embodiments, some of which are illustrated in the accompanying drawings, wherein like reference numerals refer to like elements throughout and the sizes of elements may be exaggerated for clarity of illustration. In this regard, some example embodiments may have different forms and should not be construed as being limited to the descriptions set forth herein. Accordingly, some example embodiments are merely described below, by referring to the figures, to explain aspects. Some example embodiments described herein are for illustrative purposes only, and various modifications may be made therein. As used herein, the term "and/or" includes any and all combinations of one or more of the associated listed items. Expressions such as "at least one of," when preceding a list of elements, modify the entire list of elements and do not modify the individual elements of the list.

In the following description, when an element is referred to as being "above" or "on" another element, it may be directly on an upper, lower, left, or right side of the other element while making contact with the other element or may be above an upper, lower, left, or right side of the other element without making contact with the other element. The terms of a singular form may include plural forms unless otherwise mentioned. It will be further understood that the terms "comprises" and/or "comprising" used herein specify the presence of stated features or elements, but do not preclude the presence or addition of one or more other features or elements.

An element referred to with the definite article or a demonstrative determiner may be construed as the element or the elements even though it has a singular form. Operations of a method may be performed in an appropriate order unless explicitly described in terms of order or described to the contrary, and are not limited to the stated order thereof.

In the inventive concepts, terms such as "unit" or "module" may be used to denote a unit that has at least one function or operation and is implemented with hardware, software, or a combination of hardware and software.

Furthermore, line connections or connection members between elements depicted in the drawings represent functional connections and/or physical or circuit connections by way of example, and in actual applications, they may be replaced or embodied with various additional functional connections, physical connections, or circuit connections.

It will be understood that although terms such as "first" and "second" are used herein to describe various elements, these elements should not be limited by these terms. These terms are only used to distinguish one element from other elements.

The use of the term "the" and similar demonstratives may correspond to both the singular and the plural. Operations constituting methods may be performed in any suitable order unless otherwise indicated herein or otherwise clearly contradicted by context and are not necessarily limited to the stated order.

The use of all illustrations or illustrative terms in some example embodiments is simply to describe the technical ideas in detail, and the scope of the present inventive concepts is not limited by the illustrations or illustrative terms unless they are limited by claims.

It will be understood that elements and/or properties thereof may be recited herein as being "the same" or "equal" as other elements, and it will be further understood that elements and/or properties thereof recited herein as being "identical" to, "the same" as, or "equal" to other elements may be "identical" to, "the same" as, or "equal" to or "substantially identical" to, "substantially the same" as or "substantially equal" to the other elements and/or properties thereof. Elements and/or properties thereof that are "substantially identical" to, "substantially the same" as or "substantially equal" to other elements and/or properties thereof will be understood to include elements and/or properties thereof that are identical to, the same as, or equal to the other elements and/or properties thereof within manufacturing tolerances and/or material tolerances. Elements and/or properties thereof that are identical or substantially identical to and/or the same or substantially the same as other elements and/or properties thereof may be structurally the same or substantially the same, functionally the same or substantially the same, and/or compositionally the same or substantially the same. While the term "same," "equal" or "identical" may be used in description of some example embodiments, it should be understood that some imprecisions may exist. Thus, when one element is referred to as being the same as another element, it should be understood that an element or a value is the same as another element within a desired manufacturing or operational tolerance range (e.g., ±10%).

It will be understood that elements and/or properties thereof described herein as being "substantially" the same and/or identical encompasses elements and/or properties thereof that have a relative difference in magnitude that is equal to or less than 10%. Further, regardless of whether elements and/or properties thereof are modified as "substantially," it will be understood that these elements and/or properties thereof should be construed as including a manufacturing or operational tolerance (e.g., ±10%) around the stated elements and/or properties thereof.

When the terms "about" or "substantially" are used in this specification in connection with a numerical value, it is intended that the associated numerical value includes a manufacturing or operational tolerance (e.g., ±10%) around the stated numerical value. Moreover, when the words "about" and "substantially" are used in connection with geometric shapes, it is intended that precision of the geometric shape is not required but that latitude for the shape is within the scope of the disclosure. Further, regardless of whether numerical values or shapes are modified as "about" or "substantially," it will be understood that these values or shapes should be construed as including a manufacturing or operational tolerance (e.g., ±10%) around the stated numerical values or shapes. When ranges are specified, the range includes all values therebetween such as increments of 0.1%.

As described herein, when an operation is described to be performed, or an effect such as a structure is described to be established "by" or "through" performing additional operations, it will be understood that the operation may be performed and/or the effect/structure may be established "based on" the additional operations, which may include performing said additional operations alone or in combination with other further additional operations.

Examples or example terms are just used herein to describe technical ideas and should not be considered for purposes of limitation unless defined by the claims.

FIG. 1 is a block diagram illustrating a beam scanning device 1 configured to scan an external space with a plurality of light beams according to some example embodiments. Referring to FIG. 1, the beam scanning device 1 may include: a light source array 10 configured to emit a plurality of light beams; a light modulation array 20 configured to scan an external space by phase modulating the light beams, arranging the phase-modulated light beams in a first direction (for example, a Y-axis direction), and then sequentially steering the light beams in a second direction (for example, an X-axis direction) that is different from the first direction (for example, the Y-axis direction); and a processor 30 configured to control the light modulation array 20 such that the degree of steering shift for the external space may vary depending on whether a region of interest is in (e.g., is determined to be in) the external space. The light modulation array 20 may be configured to simultaneously or substantially simultaneously steer the plurality of light beams in a same direction, but example embodiments are not limited thereto.

The light source array 10 may include a plurality of light sources. Each of the light sources may be a device capable of emitting light (e.g., a light beam) in an infrared region (e.g., an infrared wavelength band). The use of light in an infrared region may reduce, minimize, or prevent mixing (e.g., mixing of the emitted light) with natural light including sunlight and ranging in the visible region. However, example embodiments are not limited thereto, and the light source array 10 may include light sources capable of emitting light in various wavelength bands or different wavelength bands. In addition, the light source array 10 may emit pulsed light or continuous light.

Each of the light sources may include a laser diode (LD), an edge emitting laser, a vertical-cavity surface emitting laser (VCSEL), a distributed feedback laser, a light-emitting diode (LED), a super luminescent diode (SLD), or the like. However, example embodiments are not limited thereto.

The light sources may emit light beams having the same optical characteristics or different optical characteristics to the light modulation array 20. Here, examples of the optical characteristics may include a waveform, a period, a duty ratio, and the like. For example, the light sources may provide pulse-type light beams. The light beams may have the same pulse period and the same duty ratio.

The light sources may simultaneously provide a plurality of light beams to the light modulation array 20. However, example embodiments are not limited thereto. The light sources may sequentially provide light beams to the light modulation array 20 at different times.

The light modulation array 20 may include a plurality of spatial light modulators. The spatial light modulators may be arranged in the first direction (for example, the Y-axis direction). The spatial light modulators may correspond to the light sources of the light source array 10 in a one-to-one manner, for example such that each light source of the light source array 10 is configured to emit light to a separate, respective spatial light modulator of the light modulation array 20. However, example embodiments are not limited thereto. For example, the number (quantity) of spatial light modulators may be greater or less than the number of light sources.

Each of the spatial light modulators may modulate the phase of light incident thereon and may output the modulated light in a specific steering direction. The beam scanning device 1 may be a non-mechanical beam scanning device in which the light modulation array 20 adjusts the steering direction of output light by modulating the phase of incident light. A degree of steering shift refers to the difference between neighboring (e.g., adjacent, directly adjacent, etc.) steering directions when the direction of steering varies and may correspond to a scan interval in an external space. For example, the degree of steering shift and the scan interval may be proportional to each other.

The processor 30 may provide an electrical signal to the light modulation array 20 to control the steering direction of light. The processor 30 may control each of the spatial light modulators such that light beams output from the spatial light modulators may be sequentially steered in the second direction (for example, the X-axis direction). For example, the processor 30 may provide an electrical signal corresponding to a sawtooth phase profile to each of the spatial light modulators.

The processor 30 may control the light modulation array 20 such that the degree of steering shift in an external space may be adjusted based on information about the external space. For example, the light modulation array 20 may be controlled such that the degree of steering shift of the light modulation array 20 may vary depending on whether a region of interest is in (e.g., is determined to be located in) the external space. The processor 30 may control the light modulation array 20 such that the region of interest in the external space may be scanned with a relatively small degree of steering shift, and the other region in the external space, that is a region of non-interest, may be scanned with a relatively large degree of steering shift.

In some example embodiments, the processor 30 may control the light source array 10 such that the intensity of light may be adjusted (e.g., to cause the intensity of light emitted by the light source array 10 to be adjusted or to vary) based on information about the external space. In some example embodiments, the processor 30 may control the light source array 10 to cause an intensity of light emitted by the light source array 10 to vary during scanning of an external space depending on whether there is an object in the external space. For example, the processor 30 may control the light source array 10 such that low-intensity light may be output (e.g., emitted) to a region containing an object in the external space, and high-intensity light (e.g., having an intensity that is greater than the intensity of the low-intensity light) may be output to a region containing no object in in the external space.

Figure 2A:
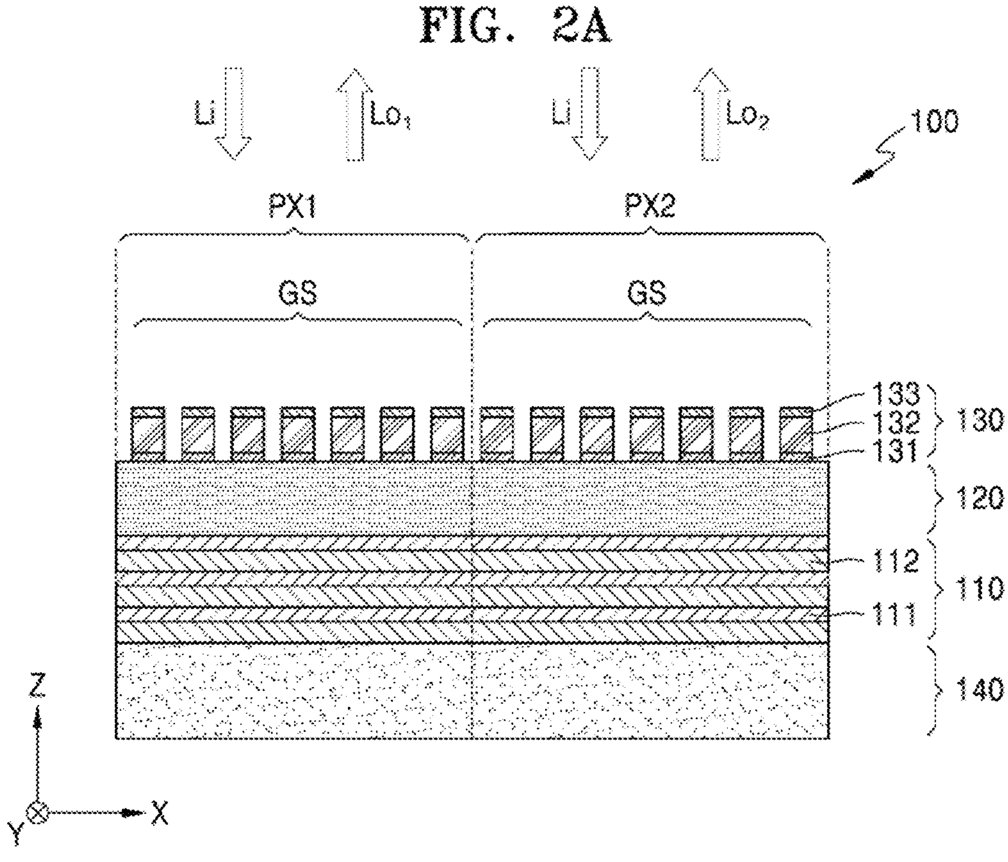
FIG. 2A is a cross-sectional view conceptually illustrating a spatial light modulator as an example of spatial light modulators applicable to a beam scanning device according to some example embodiments.
Figure 2B:
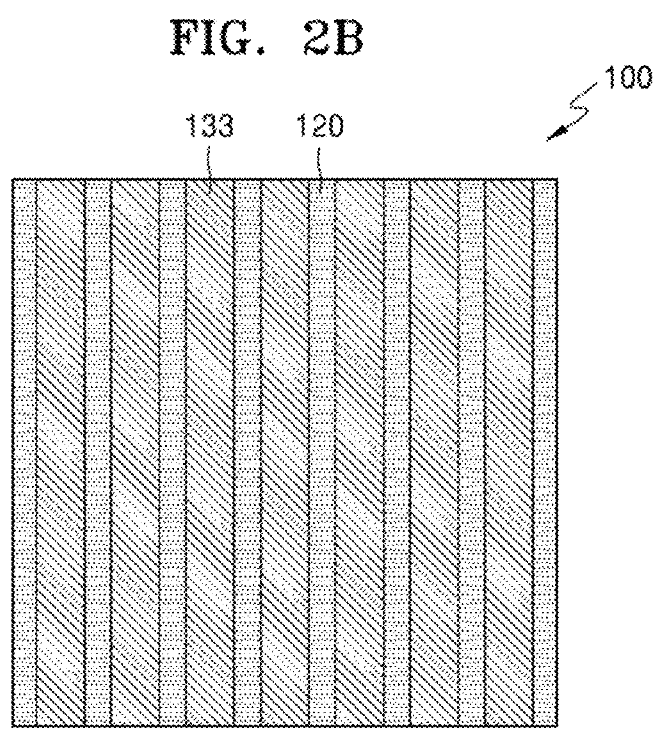
FIG. 2B is a plan view illustrating a pixel of the spatial light modulator shown in FIG. 2A according to some example embodiments.

FIG. 2A is a cross-sectional view conceptually illustrating a spatial light modulator 100 as an example of spatial light modulators applicable to the beam scanning device 1 according to some example embodiments. FIG. 2B is a plan view illustrating one pixel of the spatial light modulator 100 shown in FIG. 2A according to some example embodiments. FIG. 2A illustrates a first pixel PX1 and a second pixel PX2 as examples.

Referring to FIGS. 2A and 2B, the spatial light modulator 100 may include a first material layer 110, a cavity layer 120 disposed on the first material layer 110, and a second material layer 130 disposed on the cavity layer 120.

The spatial light modulator 100 may modulate the phase of incident light Li and may output modulated light as output light Lo. The spatial light modulator 100 may include a plurality of pixels to steer incident light Li by phase modulation. For example, the pixels may include the first pixel PX1 and the second pixel PX2. The term "pixel" may refer to the smallest unit that is independently driven in the spatial light modulator 100 or a basic unit that is capable of independently modulating the phase of light. Each of the pixels may include one or more grating structures GS that forms the second material layer 130.

FIG. 2A illustrates an example structure including two pixels, that is, the first pixel PX1 and the second pixel PX2. The spatial light modulator 100 may have a structure in which pixels are one-dimensionally or two-dimensionally arranged. In addition, FIG. 2A illustrates that each of the first and second pixels PX1 and PX2 includes seven grating structures GS. However, this is merely an example, and example embodiments are not limited thereto. The pitch between the grating structures GS may be less than the wavelength of modulated light. The length of a side of each of the first and second pixels PX1 and PX2 may be, for example, about 3 μm to about 300 μm.

In addition, the spatial light modulator 100 may further include a substrate 140 that supports the first material layer 110. The substrate 140 may include an insulating material. For example, the substrate 140 may be a transparent substrate (for example, a glass substrate) that transmits light or a semiconductor substrate (for example, a silicon substrate). In addition, examples of the substrate 140 may include substrates including various types of materials.

The first material layer 110 may be a distributed Bragg reflector. For example, the first material layer 110 may include a first layer 111 and a second layer 112 that have different refractive indices. The first layer 111 and the second layer 112 may be alternately and repeatedly stacked. Owing to the difference between the refractive index of the first layer 111 and the refractive index of the second layer 112, light may be reflected at an interface of each of the first and second layers 111 and 112 layer, and reflected light beams may interfere with each other. The first layer 111 or the second layer 112 may include silicon (Si), silicon nitride ($Si_3N_4$), silicon oxide ($SiO_2$), titanium oxide ($TiO_2$), or the like. For example, the first layer 111 may include silicon (Si), and the second layer 112 may include silicon oxide ($SiO_2$). The light reflectance of the first material layer 110 may be designed by adjusting the thicknesses and/or the number of first and second layers 111 and 112 that are stacked in the first material layer 110.

The first material layer 110 may have a structure other than the distributed Bragg reflector and may include, for example, a metal material layer having a metal surface.

The cavity layer 120 may be a region in which incident light resonates and may be disposed between the first material layer 110 and the second material layer 130.

The cavity layer 120 may include, for example, silicon oxide ($SiO_2$). The resonance wavelength of light may be determined by the thickness of the cavity layer 120. As the thickness of the cavity layer 120 increases, the resonance wavelength of light may increase, and as the thickness of the cavity layer 120 decreases, the resonance wavelength of light may decrease.

The second material layer 130 may be designed to appropriately perform a function of reflecting light in a specific wavelength and a function of modulating the phase of output light.

The second material layer 130 may include a plurality of grating structures GS arranged at particular (or, alternatively, predetermined) intervals. The thickness, width, or pitch of the grating structure GS may be less than the wavelength of light modulated by the spatial light modulator 100. The reflection of modulated light may be increased by adjusting factors such as the thickness, width, or pitch of the grating structures GS. The reflectance of the second material layer 130 may be different from the reflectance of the first material layer 110, and the reflectance of the second material layer 130 may be less than the reflectance of the first material layer 110.

The spatial light modulator 100 may be a reflective or transmissive spatial light modulator. FIG. 2A illustrates an example in which the spatial light modulator 100 is of a reflective type. Hereinafter, the case in which the spatial light modulator 100 is of a reflective type will be described as an example. However, the spatial light modulator 100 may be of a transmissive type.

Light Li incident on the spatial light modulator 100 passes through the second material layer 130 and propagates to the cavity layer 120. Then, the light Li is reflected by the first material layer 110, that is, a distributed Bragg reflector, and is trapped in the cavity layer 120 by the first material layer 110 and the second material layer 130, thereby resonating. Thereafter, the light Li is output through the second material layer 130. Light $Lo_1$ and light $Lo_2$ output through the first pixel PX1 and the second pixel PX2 may each have a specific phase, and the phases of the light $Lo_1$ and the light $Lo_2$ may be controlled by the refractive index of the second material layer 130. A light travel direction may be determined by a phase relationship of light output from adjacent pixels. For example, when the phase of the light $Lo_1$ output from the first pixel PX1 and the phase of light $Lo_2$ output from the second pixel PX2 are different from each other, a light travel direction may be determined by an interaction between the light $Lo_1$ and the light $Lo_2$.

Figure 3A:
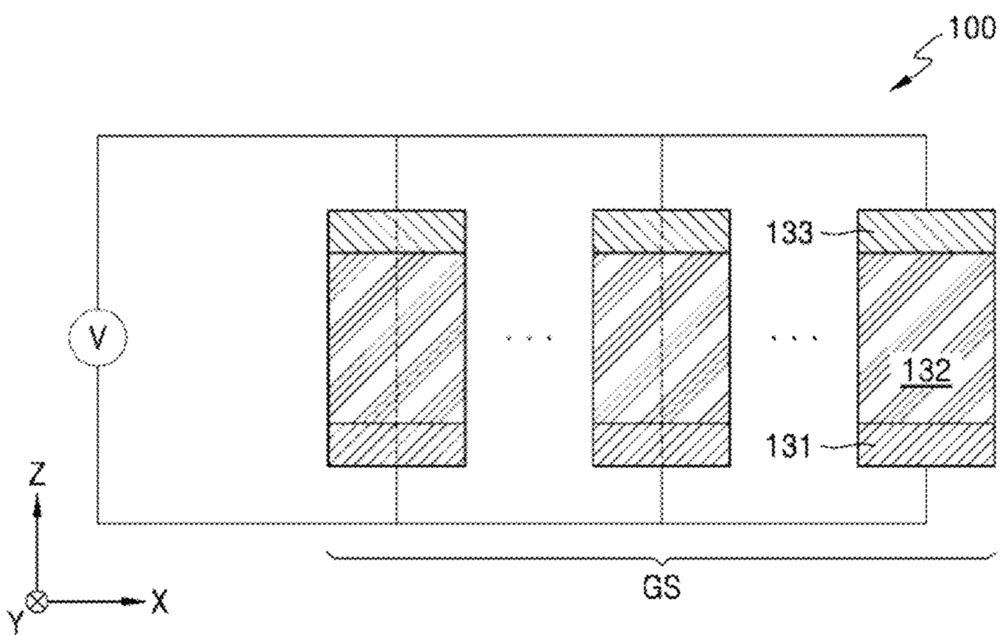
FIG. 3A is a cross-sectional view illustrating grating structures included in pixels shown in FIG. 2A according to some example embodiments.
Figure 3B:
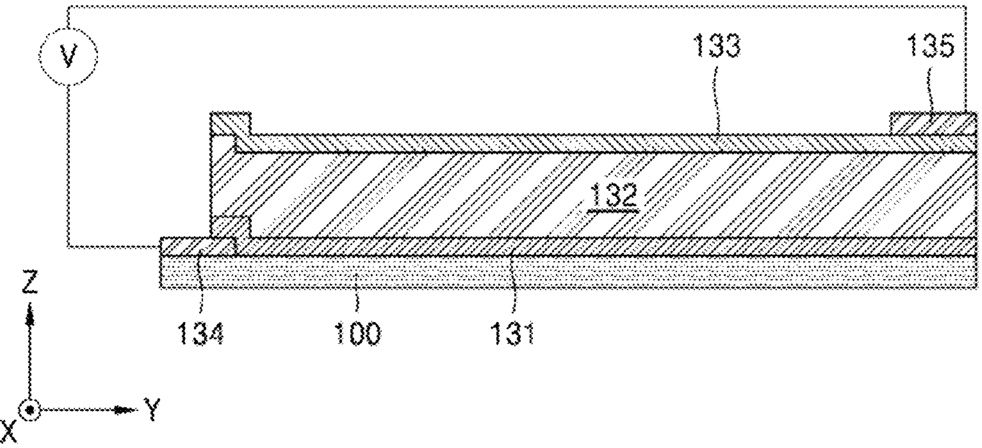
FIG. 3B is a cross-sectional view illustrating the grating structures included in pixels shown in FIG. 2A in another direction according to some example embodiments.

FIG. 3A is a cross-sectional view illustrating the grating structures GS included in the first and second pixels PX1 and PX2 shown in FIG. 2A, and FIG. 3B is a cross-sectional view illustrating the grating structures GS included in at least one of the first or second pixels PX1 or PX2 shown in FIG. 2A in another direction (the Y-axis direction).

Referring to FIG. 3A, the grating structures GS may each include a first doped semiconductor layer 131, an intrinsic semiconductor layer 132, and a second doped semiconductor layer 133. For example, the first doped semiconductor layer 131 may be an n-type semiconductor layer, the second doped semiconductor layer 133 may be a p-type semiconductor layer, and the grating structures GS may each be a PIN diode.

The first doped semiconductor layer 131 may be a silicon (Si) layer containing a Group 5 element such as phosphorus (P) or arsenic (As) as a dopant. The intrinsic semiconductor layer 132 may be a silicon (Si) layer that contains no dopant. The second doped semiconductor layer 133 may be a silicon (Si) layer containing a Group 3 element such as boron (B) as a dopant.

When a voltage V is applied between the first doped semiconductor layer 131 and the second doped semiconductor layer 133, current flows from the first doped semiconductor layer 131 to the second doped semiconductor layer 133, and heat is generated in the grating structures GS owing to the current. Thus, the refractive index of the grating structures GS may vary owing to the heat. When the refractive index of the grating structures GS varies, the phase of light output from the first and second pixels PX1 and PX2 may vary, and thus, the direction of light output from the spatial light modulator 100 may be controlled by adjusting the magnitude of voltage V applied to each of the first and second pixels PX1 and PX2.

FIG. 3B is a view illustrating a cross-section illustrating the grating structures GS in another direction (Y-axis direction). Referring to FIG. 3B, the spatial light modulator 100 may include first and second electrodes 134 and 135 for applying voltage to the grating structures GS. The first electrode 134 may be in contact with an end of the first doped semiconductor layer 131, and the second electrode 135 may be in contact with an end of the second doped semiconductor layer 133. In the Y-axis direction, the end that is in contact with the second electrode 135 may be opposite to the end that is in contact with the first electrode 134. The first electrode 134 may be disposed on the cavity layer 120 and may be a common electrode that applies a common voltage (e.g., a same voltage) to all pixels included in the spatial light modulator 100. The second electrode 135 may be a pixel electrode designed to apply different voltages to pixels.

FIGS. 3A and 3B illustrate that the grating structures GS have a PIN structure, but example embodiments are not limited thereto. The grating structures GS may have an NIN structure or a PIP structure. For example, the first and second doped semiconductor layers 131 and 133 may be an n-type semiconductor layers or p-type semiconductor layers.

According to some example embodiments, the grating structures GS of the spatial light modulator 100 may be based on silicon. The refractive index of silicon is proportional to temperature. The greater the temperature of silicon changes, the greater the refractive index of silicon changes. Because the refractive index of silicon is directly proportional to the temperature of silicon, the refractive index of silicon may be easily controlled by controlling the temperature of silicon. Therefore, the refractive index of the grating structures GS may be easily adjusted by controlling an electrical signal applied to silicon.

According to some example embodiments, the spatial light modulator 100 may modulate the phase of light in response to an electrical signal that is applied to the spatial light modulator 100 to control resonance conditions by varying the refractive index of the grating structures GS, and in this case, the spatial light modulator 100 may be operated according to a phase profile provided by the processor 30 to steer light in various directions.

According to some example embodiments, the spatial light modulator 100 steers light based on an electrical signal applied thereto and may thus be referred to as a non-mechanical steering device. Operational conditions such as the degree of steering shift and the order of scanning of the non-mechanical steering device are controlled using electrical signals, and thus, external spaces may be scanned in various manners using the non-mechanical steering device.

Figure 4A:
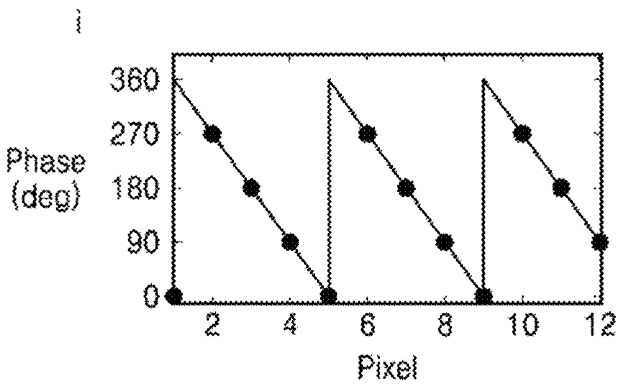
FIGS. 4A, 4B, and 4C are views illustrating phase profiles applied to a spatial light modulator and the intensity of light output from the spatial light modulator, according to some example embodiments.
Figure 4A:
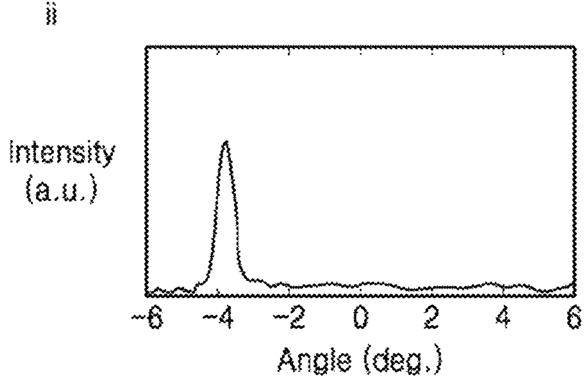
Figure 4B:
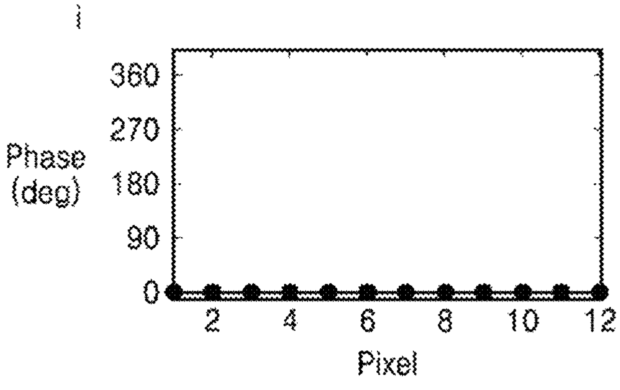
Figure 4B:
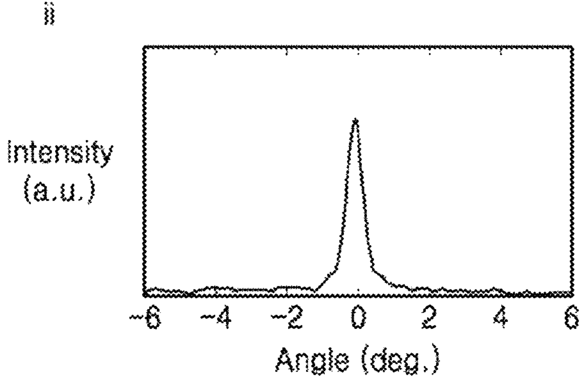
Figure 4C:
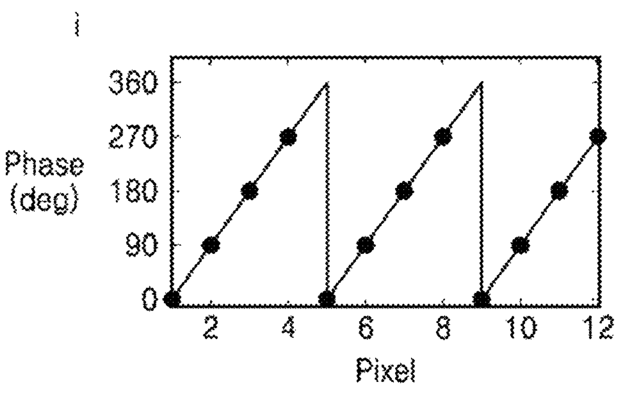
Figure 4C:
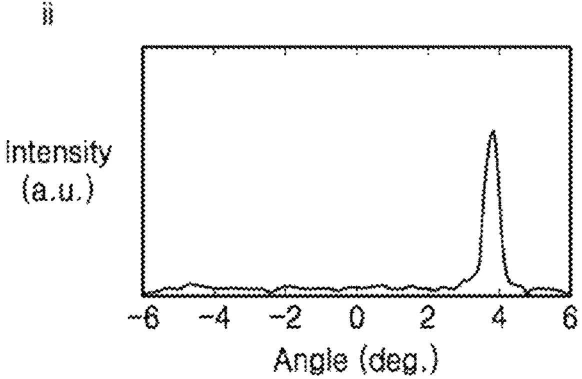

FIGS. 4A, 4B, and 4C are views illustrating phase profiles applied to a spatial light modulator and the intensity of light output from the spatial light modulator, according to some example embodiments. For example, the spatial light modulator may include 12 pixels.

As shown in a graph (i) of FIG. 4A, the processor 30 may provide an electrical signal corresponding to a first sawtooth phase profile to the spatial light modulator. For example, the first sawtooth phase profile may be of a type in which a vertical rise and a slow negative ramp are repeated as one cycle. Based on the phase profile shown in the graph (i) of FIG. 4A, the spatial light modulator may steer a light beam in a direction of about −4 degrees as shown in a graph (ii) of FIG. 4A.

In some example embodiments, as shown in a graph (i) of FIG. 4B, the processor 30 may apply, to the spatial light modulator, an electrical signal corresponding to a phase profile having no phase modulation. Then, as shown in a graph (ii) of FIG. 4B, the spatial light modulator may output incident light without steering.

In some example embodiments, as shown in a graph (i) of FIG. 4C, the processor 30 may provide an electrical signal corresponding to a second sawtooth phase profile to the spatial light modulator. For example, the second sawtooth phase profile may be of a type in which a slow positive ramp and a steep decay are repeated as one cycle. Based on the phase profile shown in the graph (i) of FIG. 4C, the spatial light modulator may steer light in a direction of about +4 degrees as shown in a graph (ii) of FIG. 4C.

As described above, a light beam may be accurately steered in a specific direction by providing a sawtooth phase profile to the spatial light modulator. At least one spatial light modulator may be configured to modulate, based on a sawtooth phase profile of an electronic signal applied thereto (e.g., by the processor 30), a phase of light emitted from the spatial light modulator and thus an angle at which the light is steered by the light modulator array 20 to be scanned in an external space.

Figure 5:
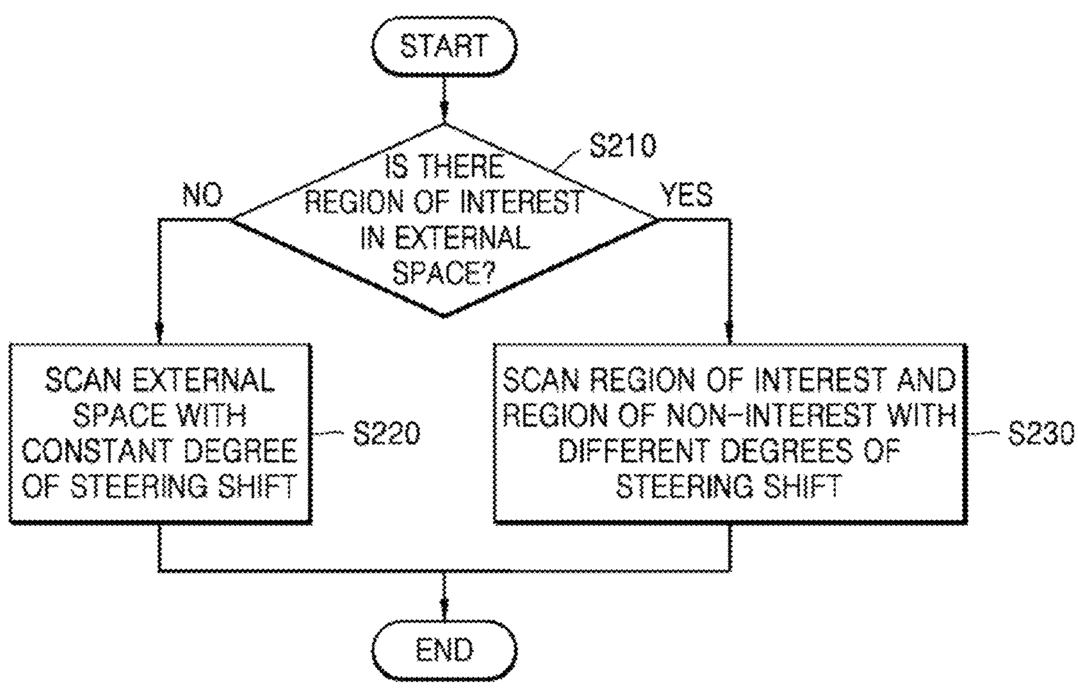
FIG. 5 is a flowchart illustrating a method by which a beam scanning device according to some example embodiments scans an external space.

FIG. 5 is a flowchart illustrating a method of scanning an external space using the beam scanning device 1 according to some example embodiments. The method may be performed based on the processor 30 executing a program of instructions, for example executing a program of instructions stored in a memory device (e.g., a solid state drive storage device) that may be included in and/or external to the beam scanning device.

The processor 30 may determine whether there is a region of interest in an external space, also referred to herein as determining whether a region of interest is located in the external space (operation S210). The external space may include a field of view of the beam scanning device 1, a field of view of a user supported by the beam scanning device 1, or the like. The region of interest in the external space may include at least one of a region that contains an object or a region that is within the field of view of a user. The processor 30 may obtain information about (e.g., information associated with) the external space. According to some example embodiments, the beam scanning device 1 may determine a region including an object in the external space as a region of interest based on a frame containing information about the external space. In some example embodiments, when information about a user's gaze is obtained using a gaze tracking sensor, the processor 30 may determine a region of interest in the external space based on the information about a user's gaze (e.g., information indicating that the user's gaze is directed to the region for greater than a threshold period of time (e.g., 2 second), the threshold period of time being stored at a memory device of the beam scanning device 1 or a device including same). In some example embodiments, information about a region of interest may be prestored in the beam scanning device 1 or may be determined by a learning algorithm such as a machine learning algorithm. The learning algorithm may include, for example, supervised learning, unsupervised learning, semi-supervised learning, or reinforcement learning, but is not limited to the above examples. As an example, the processor 30 may implement a machine learning algorithm that includes an artificial neural network that is trained on learning data generated by the processor 30 as a set of training data by, for example, a supervised, unsupervised, and/or reinforcement learning model, and wherein the processor 30 may process a feature vector to provide output based upon the training. The learning data may include empirically generated pairs of input data and output data. Artificial neural networks may be one of a deep neural network (DNN), a convolutional neural network (CNN), a recurrent neural network (RNN), a restricted Boltzmann machine (RBM), a deep belief network (DBN), a bidirectional recurrent deep neural network (BRDNN), a deep Q-network, or a combination of two or more of the above, but are not limited to the above examples. Alternatively or additionally, the processor 30 may implement other forms of artificial intelligence and/or machine learning based on the learning data, such as, for example, linear and/or logistic regression, statistical clustering, Bayesian classification, decision trees, dimensionality reduction such as principal component analysis, and expert systems; and/or combinations thereof, including ensembles such as random forests. Herein, an artificial neural network may have any structure that is trainable, e.g., with learning data that is used as training data.

When there is no region of interest in the external space (S210=NO), the processor 30 may control the light source array 10 and the light modulation array 20 to scan the external space with a constant degree of steering shift (operation S220). For example, the processor 30 may control the light source array 10 and the light modulation array 20 to scan the external space with a reference degree of steering shift. The processor 30 may control the light source array 10 to emit a plurality of light beams to the light modulation array 20 at regular (e.g., fixed) time intervals. When light beams are incident on the light modulation array 20, the processor 30 may control the light modulation array 20 such that the light beams may be arranged in a first direction (for example, a Y-axis direction), for example the processor 30 may control the light modulation array 20 to cause the light beams to be arranged in the first direction, and the processor 30 may control the light modulation array 20 such that the light beams may be steered (e.g., the processor 30 may control the light modulation array 20 to cause the light beams to be steered) with a constant degree of steering shift at regular (e.g., fixed) time intervals in a second direction (for example, an X-axis direction).

The degree of steering shift is related to a scan resolution. The scan resolution may refer to the number (quantity) of scan points in the external space when the beam scanning device 1 scans the external space once. For example, as the degree of steering shift decreases, the scan resolution may increase. However, as the scan resolution increases, a frame rate for the external space may decrease. Therefore, it may be desirable to scan the region of interest in detail while maintaining the frame rate and the scan resolution.

When it is determined (e.g., based on a determination) that there is a region of interest in (e.g., located in) the external space (S210=YES), the processor 30 may control the light source array 10 and the light modulation array 20 to scan the external space with different degrees of steering shift for the region of interest and a region of non-interest (operation S230). The processor 30 may control the light modulation array 20 to scan the region of interest of the external space with a first degree of steering shift that is less (e.g., smaller) than the reference degree of steering shift, and the region of non-interest of the external space with a second degree of steering shift that is greater than the reference degree of steering shift. The first and second degrees of steering shift may be determined so as to cause the frame rate to have a particular rate value, for example to be the same as the frame rate corresponding to scanning the entire frame with the reference degree of steering shift.

The second degree of steering shift (e.g., the magnitude thereof) may vary depending on the proportion of the region of interest in the external space (e.g., the proportion of the external space occupied by the region of interest). For example, the second degree of steering shift (e.g., the magnitude thereof) may be proportional to the proportion of the region of interest in the external space (e.g., the proportion of the external space occupied by the region of interest). In some example embodiments, the first degree of steering shift may be about 0.8 times or less than (e.g., have a magnitude that is equal to or less than 80% of the magnitude of) the second degree of steering shift. For example, in some example embodiments, the first degree of steering shift may have a magnitude that is about 1% to about 80% the magnitude of the second degree of steering shift.

The method of FIG. 5 may further include detecting (e.g., by a light detector) reflected scanned light beams that are reflected from one or more objects in the external space and generating depth information of one or more portions of the external space based on the detecting. The method may include generating an image (e.g., a depth image) based on such detecting, for example generating an image of the external space, where one or more pixels of the generated image has a depth value corresponding to a depth determined based on detection of a light beam reflected from an object located at the location of the pixel in the image of the external space.

Figure 6A:
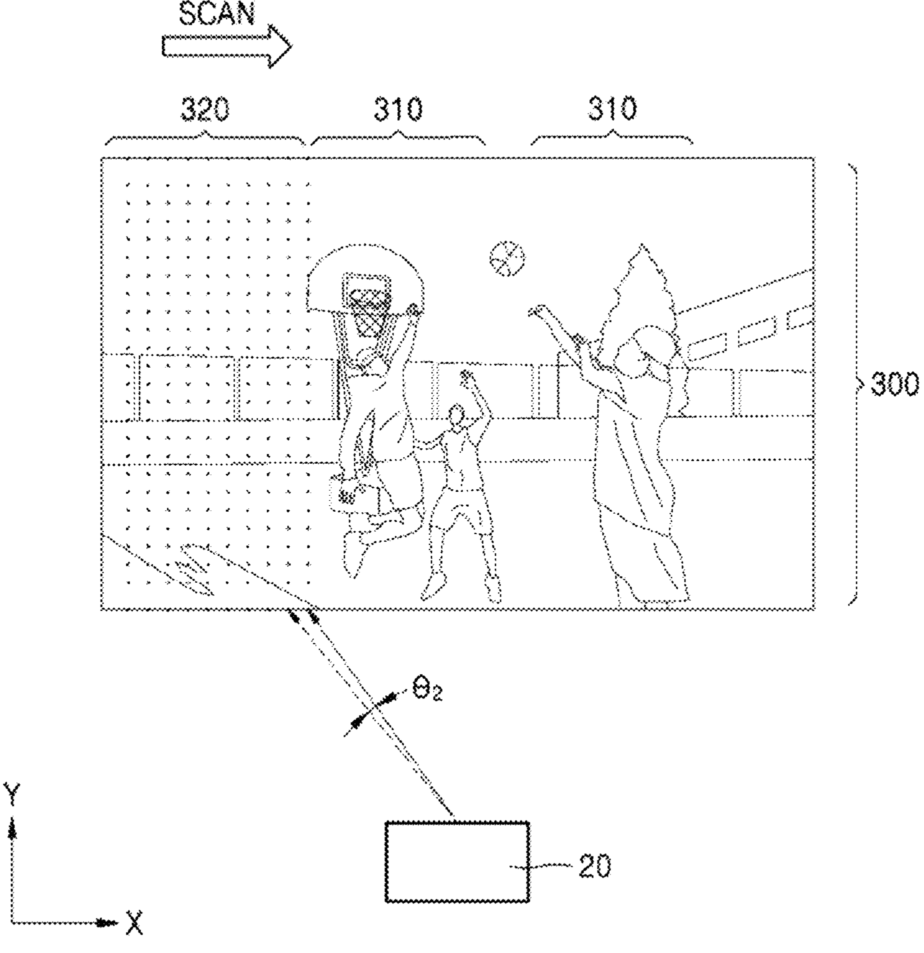
FIGS. 6A and 6B are reference views illustrating a method of scanning an external space, according to some example embodiments.
Figure 6B:
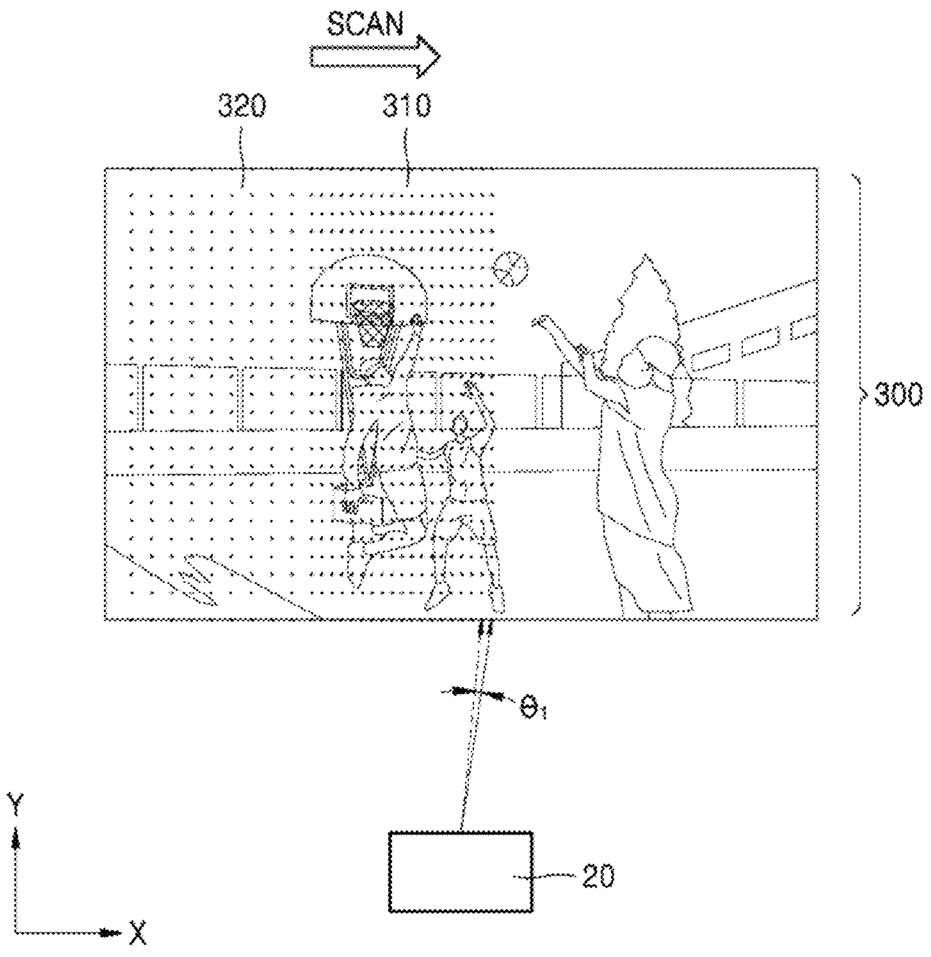

FIGS. 6A and 6B are reference views illustrating a method of scanning an external space according to some example embodiments.

The processor 30 may determine a region of interest using previous frame information or the like. For example, the processor 30 may determine a region including an object in an external space as a region of interest and a region other than the region of interest in the external space as a region of non-interest. The processor 30 may control the light modulation array 20 to divide the external space into the region of interest and the region of non-interest and may scan the region of interest and the region of non-interest with different degrees of steering shift.

Referring to FIG. 6A, the processor 30 may divide an external space 300 (e.g., a field of view of the beam scanning device 1) into a region 310 of interest that includes an object and a region 320 of non-interest that includes no object. In addition, the processor 30 control the light modulation array 20 such that a plurality of light beams may be arranged in a first direction (for example, a Y-axis direction) and sequentially steered in a second direction (for example, an X-axis direction) (e.g., based on the plurality of light beams being arranged in the first direction, sequentially steering the plurality of light beams in the second direction different from the first direction). For example, the processor 30 may control the light modulation array 20 to scan the region 320 of non-interest with a second degree $\theta_2$ of steering shift that is greater than a reference value.

In addition, as shown in FIG. 6B, the processor 30 may control the light modulation array 20 to scan the region 310 of interest with a first degree $\theta_1$ of steering shift that is less than the reference value. Accordingly, the processor 30 may control the light modulation array 20 to cause a degree of steering shift of the light modulation array 20 to vary depending on whether a region 310 of interest is located in the external space 300.

Because the degree of steering shift for the region 310 of interest is relatively small (e.g., the rate at which the light beams of the beam scanning device 1 that are arranged in the first direction are scanned over the region 310 of interest in the second direction is small), the region 310 of interest may be scanned at a relatively high scan resolution. Therefore, the region 310 of interest may be scanned at a high scan resolution while maintaining the scan resolution of an entire frame, and thus, the region 310 of interest may be accurately scanned. Where the first and second degrees of steering shift are adjusted to result in the frame rate of scanning the external space 300 to be similar or the same as a frame rate achieved by scanning the entire external space 300 at a reference degree of steering shift, the variation of degree of steering shift of the light modulation array 20 while scanning various regions of the external space may enable the beam scanning device to generate higher-resolution images of a region of interest in the frame without compromising frame rate of the scanning, and thus enabling improved functionality of the beam scanning device and/or any device including same, for example based on being configured to scan (e.g., to enable generation of images, depth images, etc. of) an external space 300 that include high-scan resolution images of a region 310 of interest without compromising frame rate of the scanning.

Figure 7:
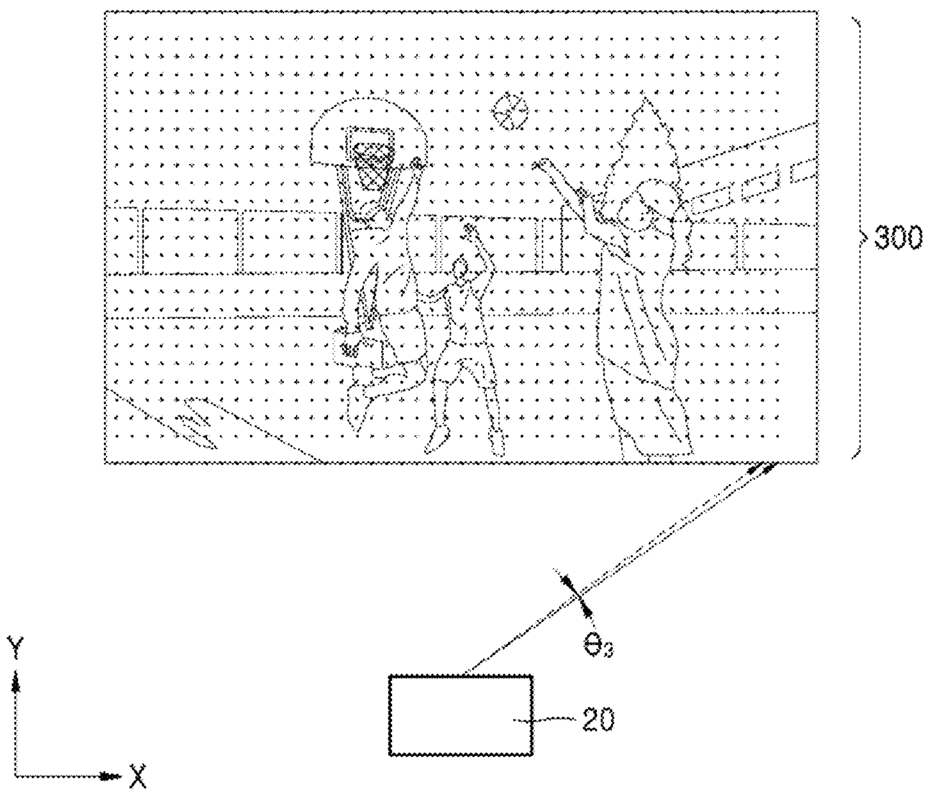
FIG. 7 is a reference view illustrating a method of scanning an external space, according to a comparative example.

FIG. 7 is a reference view illustrating a method of scanning the external space 300 according to a comparative example. Referring to FIG. 7, the processor 30 may control the light modulation array 20 to scan the external space 300 with a constant degree $\theta_3$ of steering shift. A frame obtained by scanning the external space 300 at regular intervals has the same resolution in the region 310 of interest and the region 320 of non-interest, and thus, it may be difficult to obtain more accurate information about the region 310 of interest than about the region 320 of non-interest.

When scanning the external space 300, the processor 30 may scan the region 310 of interest first and the region 320 of non-interest later (e.g., subsequently to scanning the region 310 of interest).

Figure 8A:
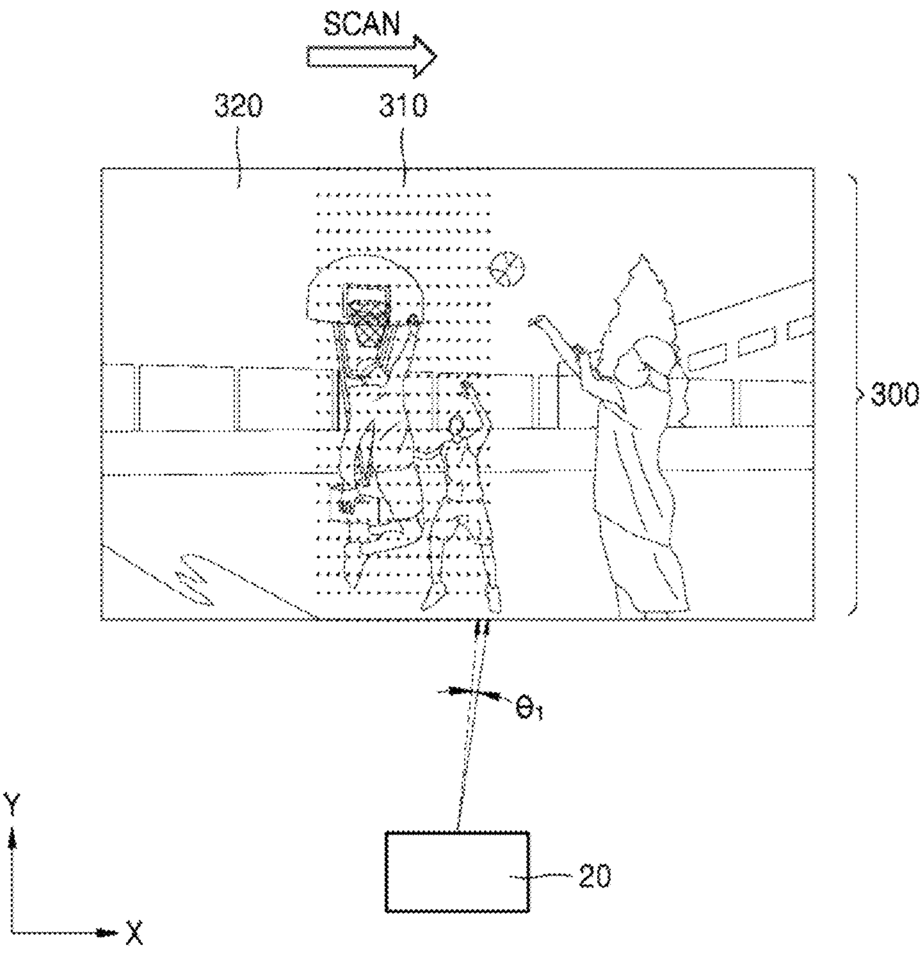
FIGS. 8A and 8B are reference views illustrating a method of scanning an external space, according to some example embodiments.
Figure 8B:
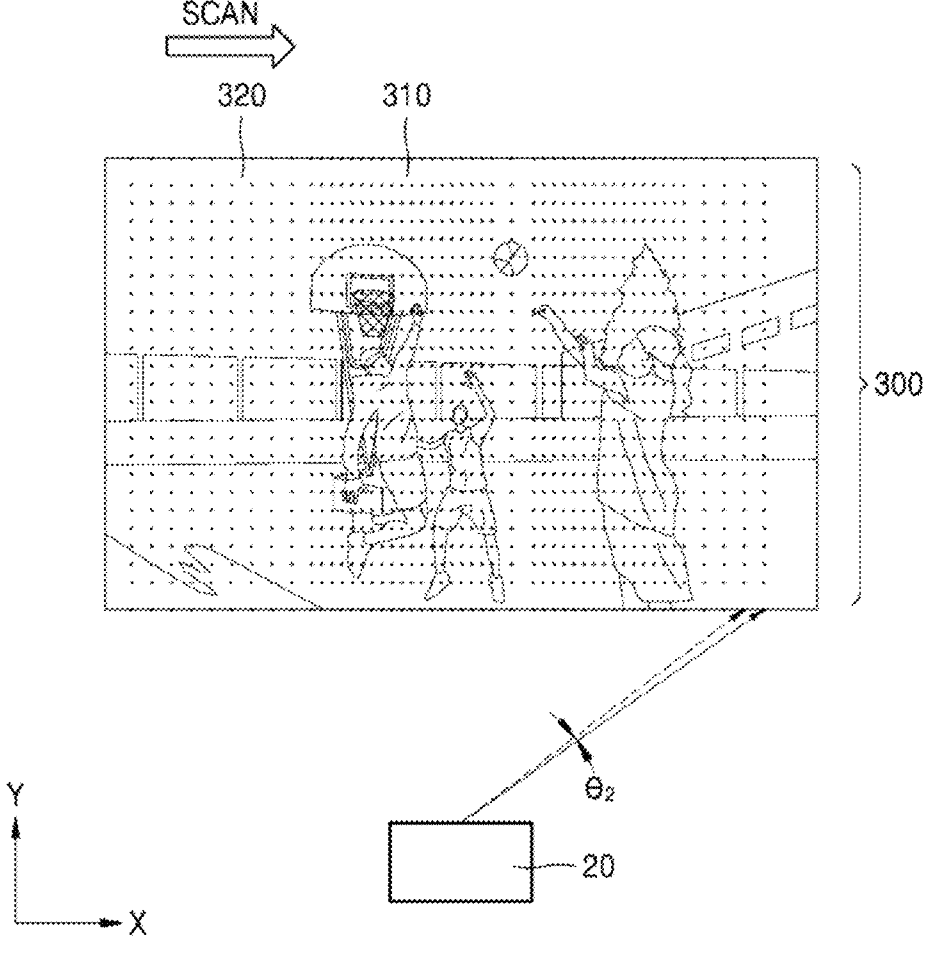

FIGS. 8A and 8B are reference views illustrating a method of scanning the external space 300 according to some example embodiments.

As shown in FIG. 8A, the processor 30 may first scan the region 310 of interest of the external space 300. For example, the processor 30 may scan the region 310 of interest by controlling the light modulation array 20 such that a plurality of light beams may be sequentially steered in the second direction (for example, the X-axis direction) in a state in which the light beams are arranged in the first direction (for example, the Y-axis direction).

Thereafter, as shown in FIG. 8B, the processor 30 may scan the region 320 of non-interest of the external space 300. For example, the processor 30 may scan the region 320 of non-interest by controlling the light modulation array 20 such that a plurality of light beams may be sequentially steered in the second direction (for example, the X-axis direction) in a state in which the light beams are arranged in the first direction (for example, the Y-axis direction).

According to some example embodiments, the light modulation array 20 adjusts the steering angle of light by modulating the phase of the light according to an electrical signal, and thus, when (e.g., based on) the region 310 of interest is first scanned and the region 320 of non-interest is later scanned (e.g., subsequently to scanning the region 310 of interest), the light modulation array 20 may be easily controlled. In addition, according to some example embodiments, when the beam scanning device 1 has irregular degrees of steering shift, the beam scanning device 1 may maintain a constant frame rate.

There may be a plurality of regions 310 of interest in the external space 300. The processor 30 may control the light modulation array 20 to scan the regions 310 of interest with different degrees of steering shift according to the importance levels of the regions 310 of interest. Information about importance may be prestored or determined by a learning algorithm such as a machine learning algorithm.

For example, when there are a plurality of objects in the external space 300, an object with (e.g., associated with) small-depth information (e.g., an object determined to be associated with a depth value indicating a depth of the object from a light detector that is relatively small based on processing a scanned light beam reflected from the object and detected at the light detector) may be more important than an object with (e.g., associated with) large-depth information (e.g., an object determined to be associated with a depth value indicating a depth of the object from a light detector that is relatively large based on processing a scanned light beam reflected from the object and detected at the light detector). In addition, when a user looks at the external space 300 with a plurality of fields of view, a region in more fields of view may be more important than a region in fewer fields of view.

The processor 30 may control the light modulation array 20 such that a degree of steering shift for a region of interest having a relatively high importance level may be less than a degree of steering shift for a region of interest having a relatively low importance level.

Figure 9A:
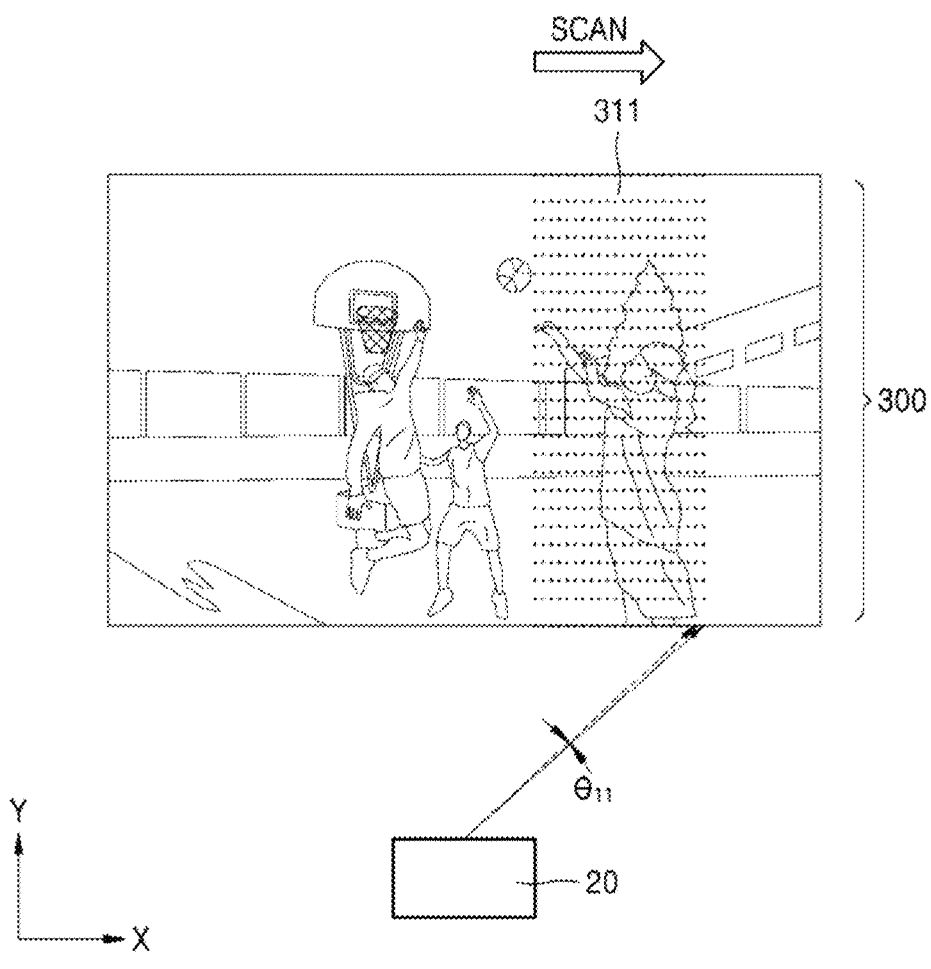
FIGS. 9A, 9B, and 9C are reference views illustrating a method of scanning an external space, according to some example embodiments.
Figure 9B:
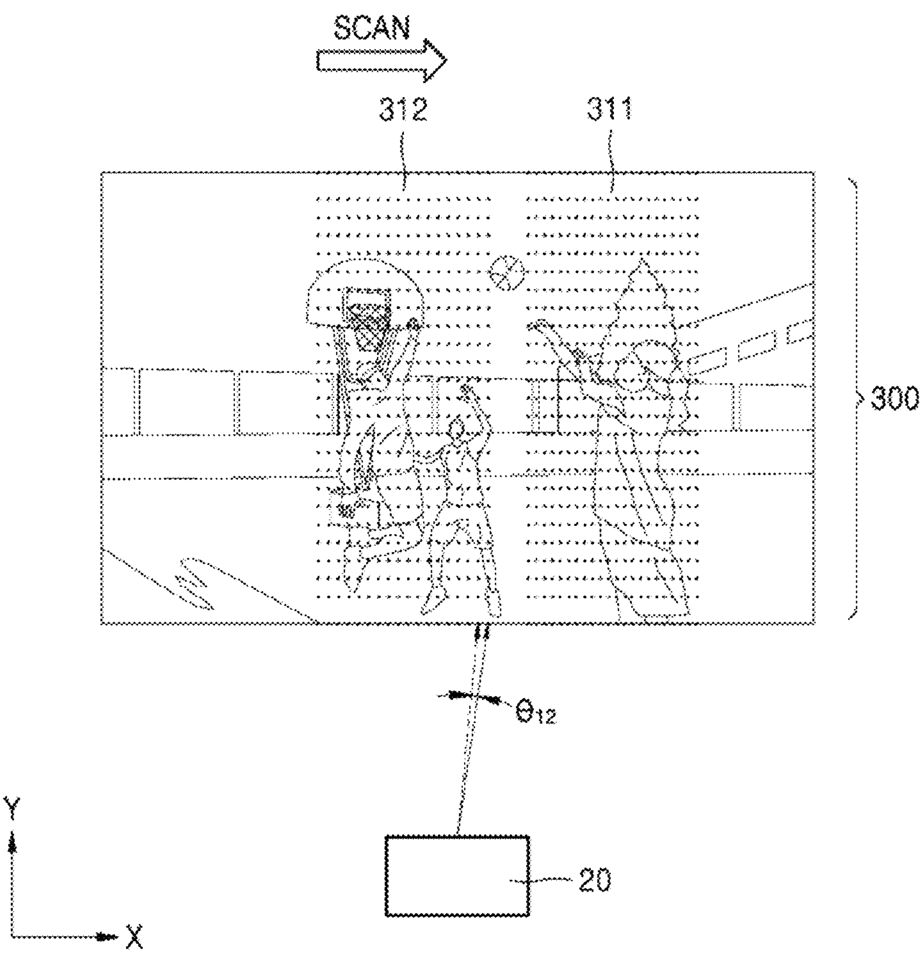
Figure 9C:
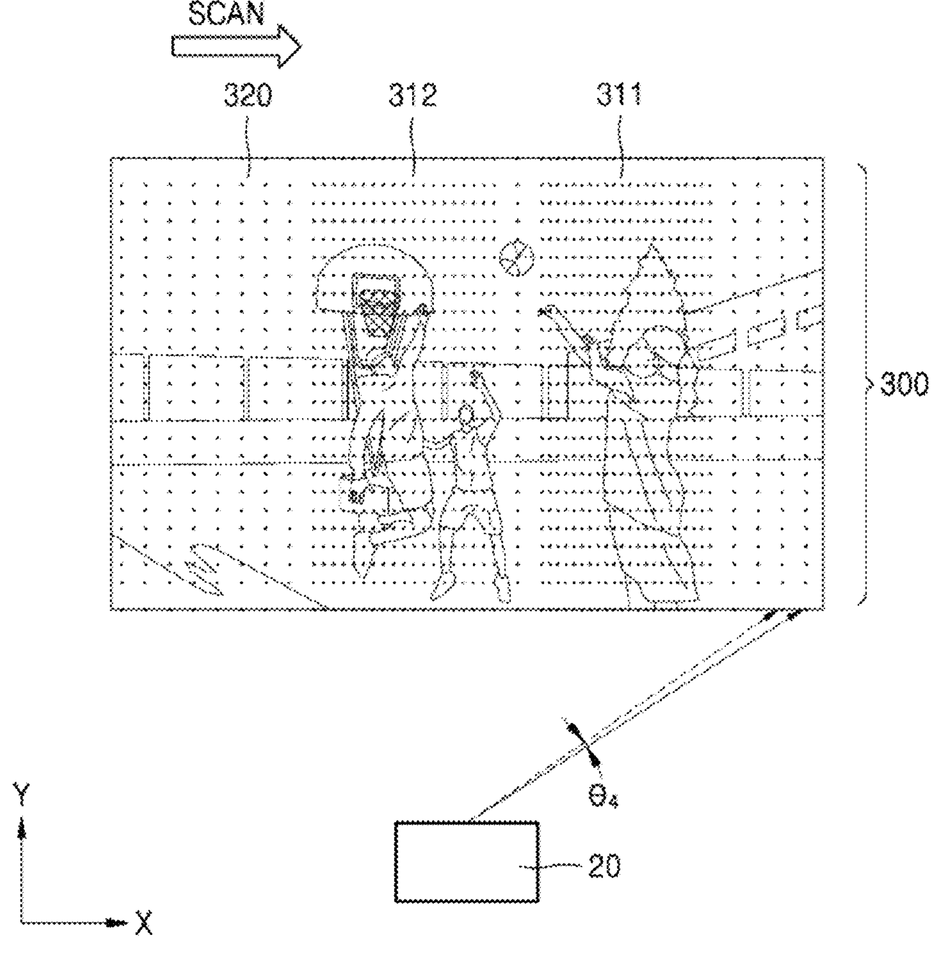

FIGS. 9A, 9B, and 9C are reference views illustrating a method of scanning an external space according to some example embodiments.

The processor 30 may determine whether there is a region of interest in an external space. When there are a plurality of regions of interest, the regions of interest may be classified by importance. In addition, degrees of steering shift may be determined according to importance.

As shown in FIG. 9A, the processor 30 may control the light modulation array 20 to first scan a first region 311 of interest that is of high importance among regions 311 and 312 of interest. The processor 30 may control the light modulation array 20 to scan the first region 311 of interest with a first sub-degree $\theta_{11}$ of steering shift.

When the first region 311 of interest is completely scanned, as shown in FIG. 9B, the processor 30 may control the light modulation array 20 to scan the second region 312 of interest that is of low importance. The processor 30 may control the light modulation array 20 to scan the second region 312 of interest with a second sub-degree $\theta_{12}$ of steering shift that is greater than the first sub-degree $\theta_{11}$ of steering shift. For example, the second sub-degree $\theta_{12}$ of steering shift may be the same as the first degree $\theta_1$ of steering shift described with reference to FIG. 6B.

When the first and second regions 311 and 312 of interest are completely scanned, as shown in FIG. 9C, the beam scanning device 1 may scan a region 320 of non-interest of the external space 300. For example, the processor 30 may control the light modulation array 20 to scan the region 320 of non-interest with a fourth degree $\theta_4$ of steering shift that is greater than the second sub-degree $\theta_{12}$ of steering shift. The fourth degree $\theta_4$ of steering shift (e.g., a magnitude thereof) may be proportional to the proportion of the first and second regions 311 and 312 of interest in the external space 300 (e.g., the proportion of the external space 300 occupied by the first and second regions 311 and 312 of interest). For example, the fourth degree $\theta_4$ of steering shift may be greater than the second degree $\theta_2$ of steering shift described with reference to FIG. 6A.

In general, the expression "there is an object in the external space 300" may indicate that the object is within a particular (or, alternatively, predetermined) distance from the beam scanning device 1. Therefore, the intensity of light reflected from a region of interest may generally be greater than the intensity of light reflected from a region of non-interest. According to some example embodiments, the beam scanning device 1 may adjust the intensity of light emitted to a region of interest to be different from the intensity of light emitted to a region of non-interest.

Figure 10:
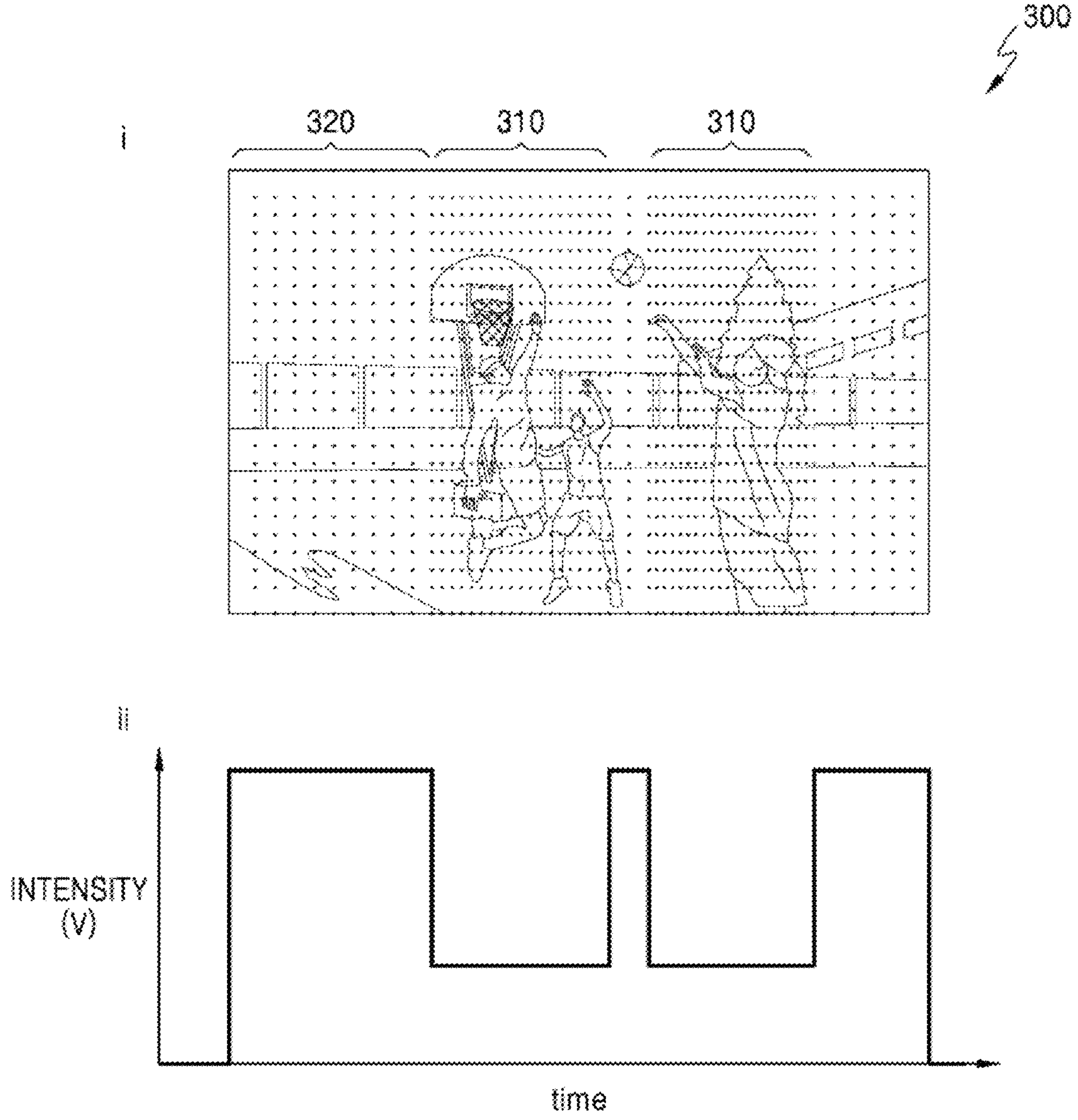
FIG. 10 is a reference diagram illustrating the intensity of light output from a light source for a region of interest and a region of non-interest, according to some example embodiments.

FIG. 10 is a reference diagram illustrating the intensity of light output from a light source for a region 310 of interest and a region 320 of non-interest, according to some example embodiments.

An image (i) in FIG. 10 shows that the degree of steering shift varies according to a region 310 of interest and a region 320 of non-interest, and a graph (ii) in FIG. 10 shows that the intensity of light emitted to the region 310 of interest is different from the intensity of light emitted to the region 320 of non-interest region. The intensity of light emitted to the region 310 of interest may be less than the intensity of light irradiated to the region 320 of non-interest. For example, the intensity of light emitted to the region 310 of interest may be less than or equal to ½ of the intensity of light emitted to the region of non-interest. However, example embodiments are not limited thereto. The intensity of light emitted to the region 310 of interest may be determined based on the intensity of light emitted to the region 310 of non-interest in a previous frame.

Figure 11:
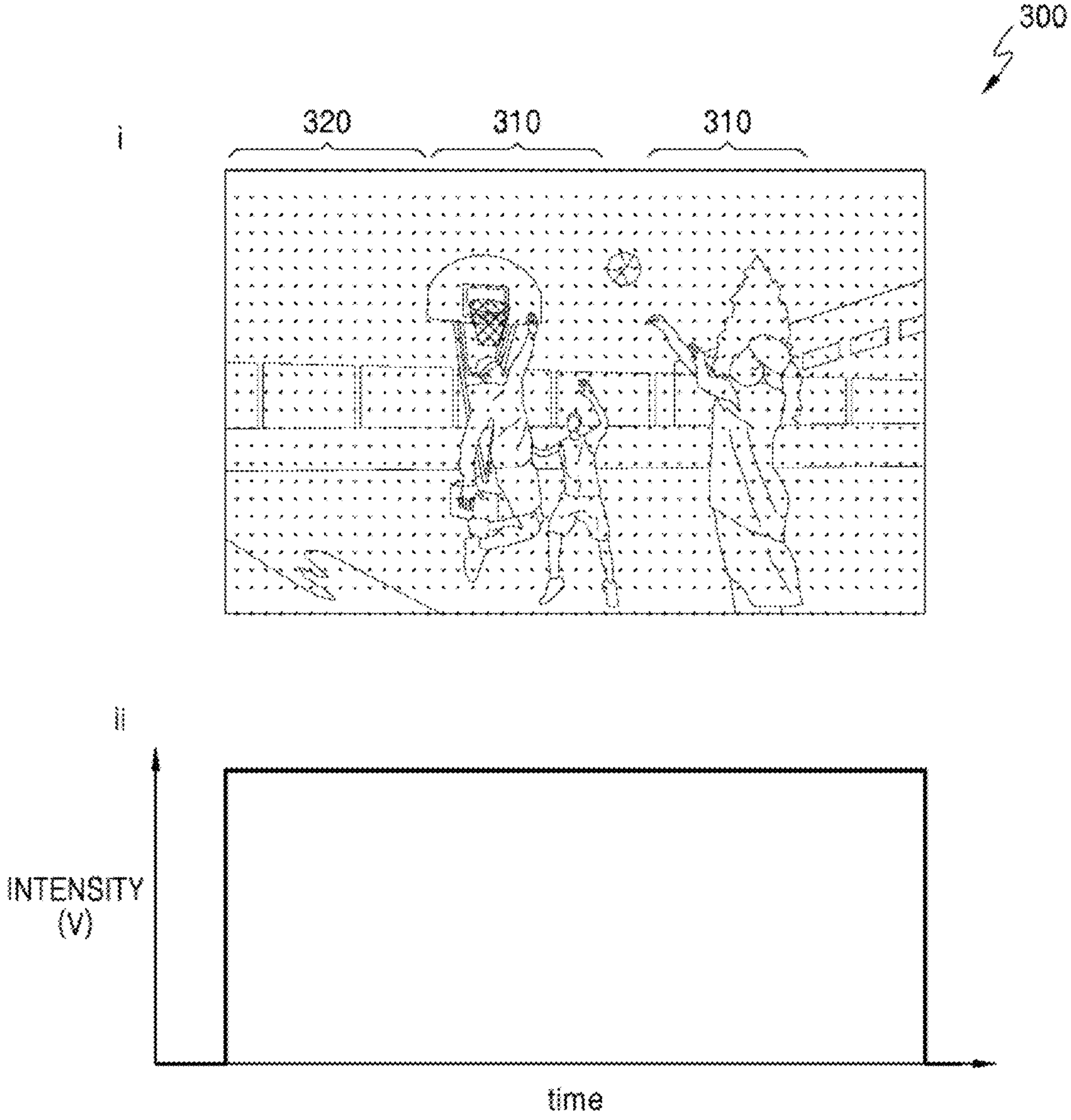
FIG. 11 is a reference diagram illustrating the intensity of light output from a light source regardless of a region of interest and a region of non-interest, according to a comparative example.

FIG. 11 is a reference diagram illustrating the intensity of light output from a light source regardless of a region 310 of interest and a region 320 of non-interest, according to a comparative example.

An image (i) in FIG. 11 shows a comparative example in which the degree of steering shift is constant in the region 310 of interest and the region 320 of non-interest, and a graph (ii) in FIG. 11 shows that the intensity of light emitted to the region 310 of interest is the same as the intensity of light emitted to the region of non-interest. When the intensity of light emitted to an external space 300 is constant regardless of the distance between objects, the intensity of received light may greatly deviate. This may cause a load on a light detector and waste of power. The intensity of light emitted to the region 310 of interest in which an object is located may be adjusted to reduce, minimize, or prevent a load on the light detector and improve power efficiency. For example, referring back to FIG. 10, the intensity of light emitted to the region 310 of interest may be less than the intensity of light irradiated to the region 320 of non-interest, together with the region 310 of interest being scanned by the plurality of light beams with a smaller degree of steering shift than the region 320 of non-interest, may configure the beam scanning device 1 to scan the external space 300 with a reduced lower on the light detector (thereby improving beam scanning performance) and with a reduced power consumption by the beam scanning device 1 without compromising beam scanning performance and/or resolution of at least the region 310 of interest.

The beam scanning device 1 described in some example embodiments above may be applied to various electronic devices.

Figure 12:
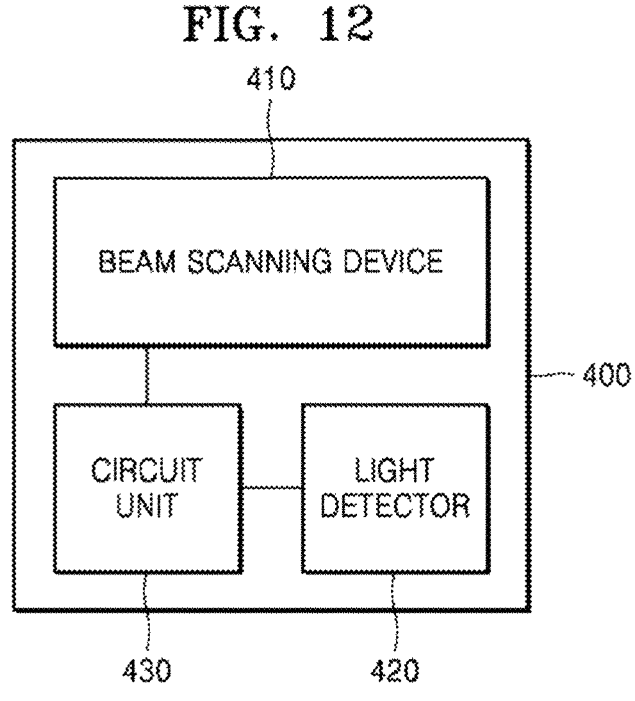
FIG. 12 is a block diagram illustrating an electronic device according to some example embodiments.

FIG. 12 is a block diagram illustrating an electronic device 400 according to some example embodiments.

Referring to FIG. 12, the electronic device 400 may be provided. The electronic device 400 may include a beam scanning device 410. The beam scanning device 410 may be the same or substantially the same as the beam scanning device 1 described with reference to FIG. 1. The electronic device 400 may include a light detector 420 configured to detect a light beam reflected from an object (not shown) among light beams used by the beam scanning device 410 for scanning. The light detector 420 may include a plurality of light detection devices and may further include other optical members.

In addition, the electronic device 400 may further include a circuit unit 430 connected to the beam scanning device 410 and the light detector 420. The circuit unit 430 (e.g., a unit of circuitry) may include (e.g., may be configured to implement) a calculation unit configured to obtain and calculate data, and may further include a driver or the like. In addition, the circuit unit 430 may further include a power supply unit and memory (e.g., a solid-state drive (SSD) storage device). The circuit unit 430 and a processor of the beam scanning device 410 may be implemented as separate chips or may be implemented as a single chip. The processor 30 of the beam scanning device 410, the circuit unit 430, or the like may be configured to obtain (e.g., generate) a frame (e.g., an image of the field of view of the beam scanning device 410, an image of the external space 300, etc.) comprising depth information (e.g., a frame or image comprising pixels each having a respective depth information) based on using results detected by the light detector 420 (e.g., reflected light beams detected by the light detector 420). The processor 30 of the beam scanning device 410, the circuit unit 430, or the like may be configured to determine a region 310 of interest in an external space 300 based on using the frame (e.g., determining that a region including pixels having depth values that are below a particular threshold value stored at a memory of the electronic device 400 is a region 310 of interest, determining that a region including one or more pixels having smallest depth values of the pixels of the frame is a region 310 of interest, etc.).

FIG. 12 illustrates an example in which the electronic device 400 includes the beam scanning device 410 and the light detector 420 in one device. However, the beam scanning device 410 and the light detector 420 may not be provided as a single device, but may be provided as separate devices. In addition, the circuit unit 430 may not be connected to the beam scanning device 410 or the light detector 420 by wire, but may be connected by wireless communication. In addition, the configuration of the electronic device 400 shown in FIG. 12 may be variously changed.

According to some example embodiments, an electronic device including the beam scanning device 1 may be a light detection and ranging (LiDAR) device. The LIDAR device may use a phase-shift method or a time-of-flight (TOF) method.

Figure 13:
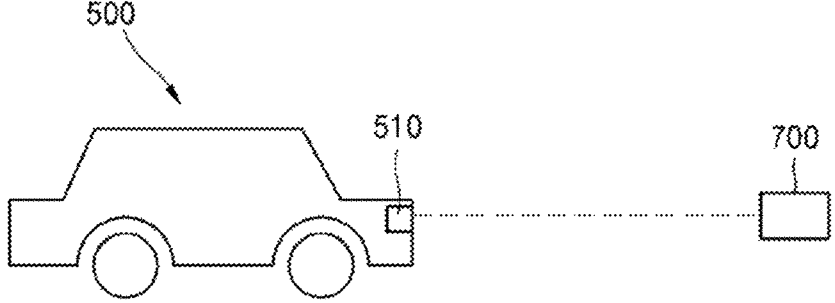
FIGS. 13 and 14 are conceptual views illustrating an example in which a light detection and ranging (LiDAR) device is applied to a vehicle, according to some example embodiments.
Figure 14:
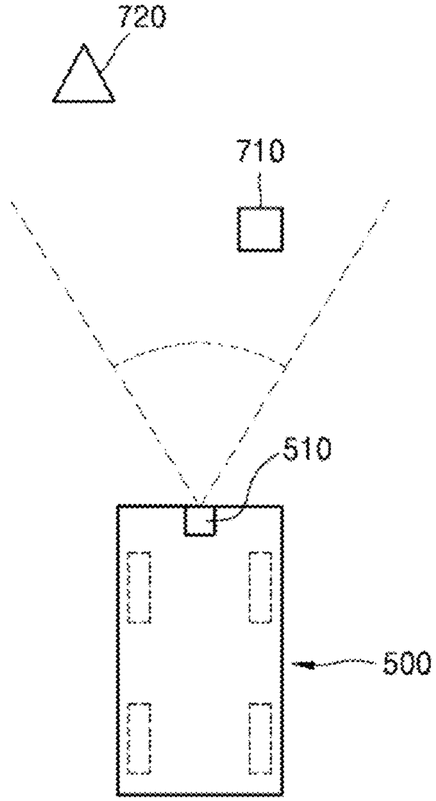

FIGS. 13 and 14 are conceptual views illustrating an example in which a LIDAR device 510 is applied to a vehicle 500 according to some example embodiments.

Referring to FIGS. 13 and 14, the LiDAR device 510 may be applied to the vehicle 500, and information about an object 700 may be obtained using the LiDAR device 510. The vehicle 500 may be an automobile having an autonomous driving function. The LIDAR device 510 may include a beam scanning device that may be the same or substantially the same as the beam scanning device 1 described with reference to FIG. 1. The LiDAR device 510 may detect an object or person, that is, the object 700, in a direction in which the vehicle 500 travels. The LiDAR device 510 may measure the distance to the object 700 using information such as a time difference between the transmission of a signal and the reception of the signal. As shown in FIG. 14, the LiDAR device 510 may obtain information about a close object 710 and a distant object 720 that are in a scan range.

According to some example embodiments, examples of a beam scanning device may include smartphones, smart watches, mobile phones, personal digital assistants (PDAs), laptop computers, personal computers (PCs), various wearable devices, mobile or non-mobile computing devices, and Internet of Things (IoT) devices.

Figure 15:
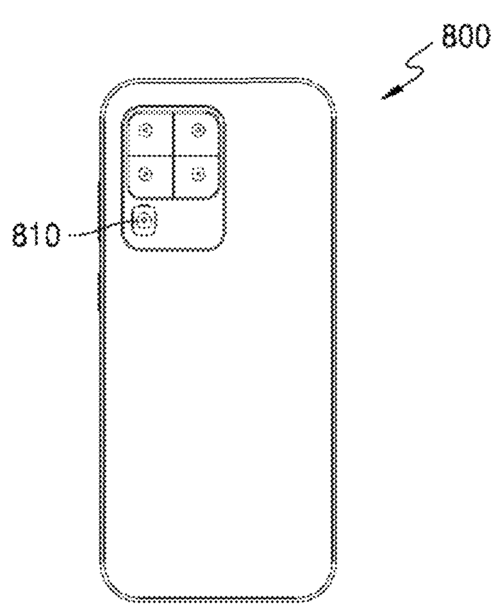
FIG. 15 is a view illustrating an example in which a smartphone includes a beam scanning device according to some example embodiments.
Figure 16:
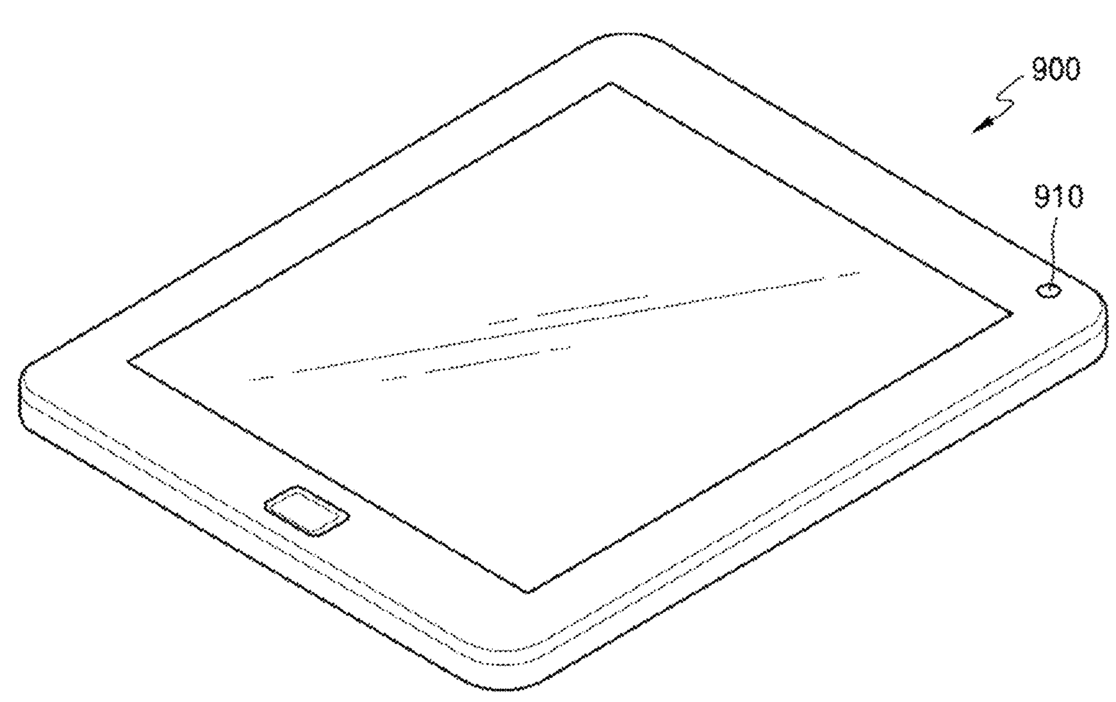
FIG. 16 is a view illustrating an example in which a tablet includes a beam scanning device according to some example embodiments.
Figure 17:
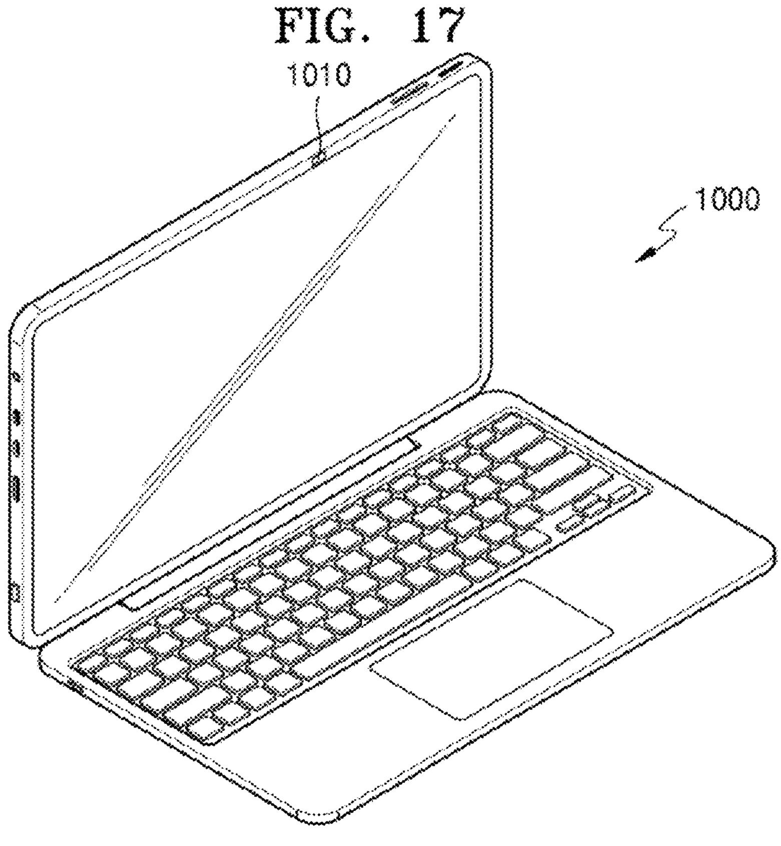
FIG. 17 is a view illustrating an example in which a laptop computer includes a beam scanning device according to some example embodiments.

FIG. 15 is a view illustrating an example in which a smartphone 800 includes a beam scanning device 810 according to some example embodiments, FIG. 16 is a view illustrating an example in which a tablet 900 includes a beam scanning device 910 according to some example embodiments, and FIG. 17 is a view illustrating an example in which a laptop computer 1000 including a beam scanning device 1010 according to some example embodiments. An electronic device such as the smartphone 800, the tablet 900, or the laptop computer 1000 may use a beam scanning device 810, 910, or 1010, that is a three-dimensional object sensor, to extract depth information of objects in an image, adjust an out-of-focus state of an image, or automatically identify objects in an image. Each of the beam scanning devices 810, 910, and 1010 may be the same or substantially the same as the beam scanning device 1 described with reference to FIG. 1.

Figure 18:
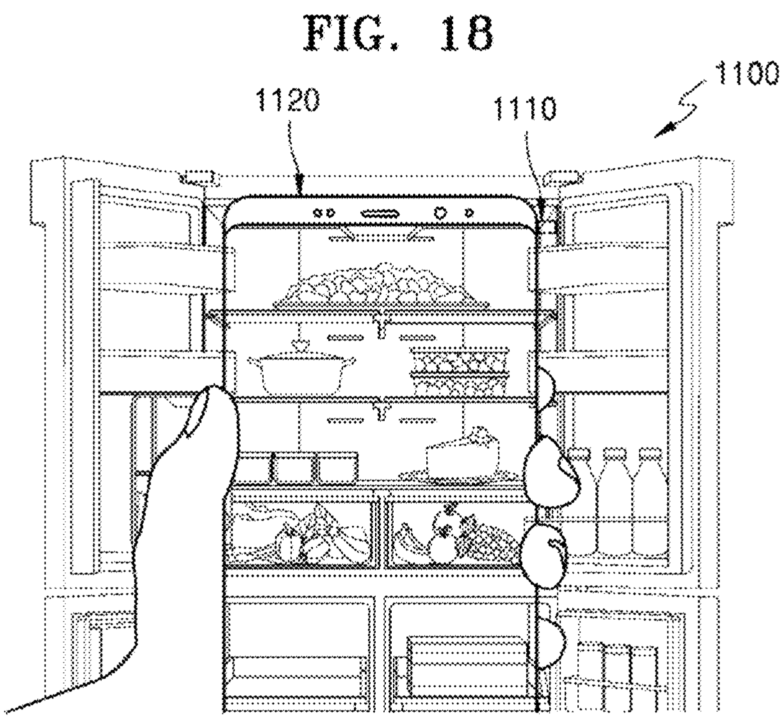
FIG. 18 is a view illustrating an example in which a smart refrigerator includes a beam scanning device according to some example embodiments.
Figure 19:
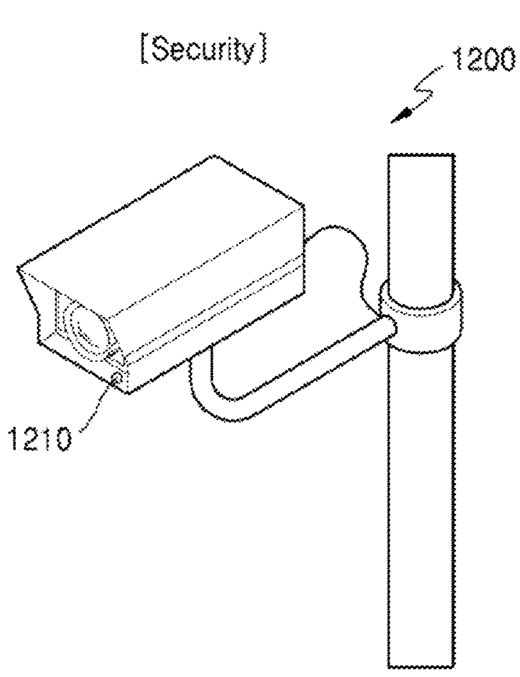
FIG. 19 is a view illustrating an example in which a security camera includes a beam scanning device according to some example embodiments.
Figure 20:
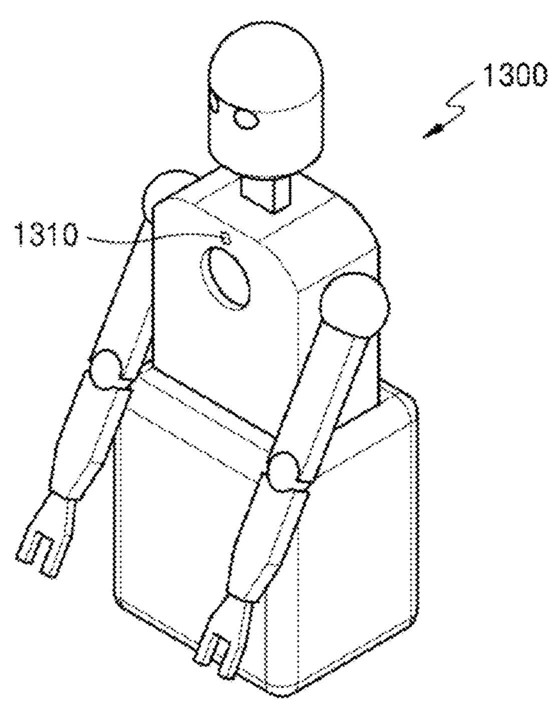
FIG. 20 is a view illustrating an example in which a robot includes a beam scanning device according to some example embodiments.

FIG. 18 is a view illustrating an example in which a smart refrigerator 1100 includes a beam scanning device 1110 according to some example embodiments, FIG. 19 is a view illustrating an example in which a security camera 1200 includes a beam scanning device 1210 according to some example embodiments, and FIG. 20 is a view illustrating an example in which a robot 1300 includes a beam scanning device 1310 according to some example embodiments. Each of the beam scanning devices 1110, 1210, and 1310 may be the same or substantially the same as the beam scanning device 1 described with reference to FIG. 1.

An electronic device including a beam scanning device may be applied to the smart refrigerator 1100 shown in FIG. 18, the security camera 1200 shown in FIG. 19, the robot 1300 shown in FIG. 20, or the like. For example, the smart refrigerator 1100 may (e.g., based on including the beam scanning device 1110) automatically recognize food contained in the smart refrigerator 1100 by using an image sensor, and may inform a user of whether a specific food is contained in the smart refrigerator 1100, the type of food put into or out of the smart refrigerator 1100, and the like through a smartphone 1120. The security camera 1200 (e.g., based on including the beam scanning device 1210) may make it possible to recognize an object or a person contained in an image even in a dark environment. The robot 1300 may be sent to a disaster or industrial site that cannot be directly accessed by humans and may (e.g., based on including the beam scanning device 1310) provide three-dimensional images.

As described herein, any devices, systems, units, blocks, circuits, controllers, processors, and/or portions thereof according to any of the example embodiments (including, for example, the beam scanning device 1, the light source array 10, the light modulation array 20, the processor 30, the electronic device 400, the beam scanning device 410, the light detector 420, the circuit unit 430, the vehicle 500, the LIDAR device 510, the smartphone 800, the beam scanning device 810, the tablet 900, the beam scanning device 910, the laptop computer 1000, the beam scanning device 1010, the smart refrigerator 1100, the beam scanning device 1110, the security camera 1200, the beam scanning device 1210, the robot 1300, the beam scanning device 1310, any portion thereof, or the like) may include, may be included in, and/or may be implemented by one or more instances of processing circuitry such as hardware including logic circuits; a hardware/software combination such as a processor executing software; or any combination thereof. For example, the processing circuitry more specifically may include, but is not limited to, a central processing unit (CPU), an arithmetic logic unit (ALU), a graphics processing unit (GPU), an application processor (AP), a digital signal processor (DSP), a microcomputer, a field programmable gate array (FPGA), and programmable logic unit, a microprocessor, application-specific integrated circuit (ASIC), a neural network processing unit (NPU), an Electronic Control Unit (ECU), an Image Signal Processor (ISP), and the like. In some example embodiments, the processing circuitry may include a non-transitory computer readable storage device (e.g., a memory), for example a solid-state drive memory device, storing a program of instructions, and a processor (e.g., CPU) configured to execute the program of instructions to implement the functionality and/or methods performed by some or all of any devices, systems, units, blocks, circuits, controllers, processors, and/or portions thereof according to any of the example embodiments.

In addition, one or more programs including instructions for implementing the above-described control methods using the processor 30 may be recorded in a non-transitory computer-readable recording medium. Examples of the non-transitory computer-readable medium may include: magnetic media such as hard disks, floppy disks, and magnetic tapes; optical recording media such as CD-ROMs and DVDs; magneto-optical media such as floptical disks; and hardware such as ROMs, RAMs, and flash memories specifically configured to store program instructions and execute the program instructions. Examples of the program instructions may include not only machine language code such as those generated by a compiler but also high-level language code executable on a computer using an interpreter or the like.

It should be understood that example embodiments described herein should be considered in a descriptive sense only and not for purposes of limitation. Descriptions of features or aspects within each example embodiment should typically be considered as available for other similar features or aspects in other example embodiments. While some example embodiments have been described with reference to the figures, it will be understood by those of ordinary skill in the art that various changes in form and details may be made therein without departing from the spirit and scope as defined by the following claims.

What is claimed is:

1. A beam scanning device, comprising:

a light modulation array configured to scan an external space based on phase modulating a plurality of light beams and, in a state in which the plurality of light beams are arranged in a first direction, sequentially steering the plurality of light beams in a second direction different from the first direction; and a processor configured to control the light modulation array to cause a degree of steering shift of the light modulation array to vary depending on whether a region of interest is determined to be located in the external space, wherein, the processor is further configured to, based on the light modulation array scanning the region of interest in the external space, control the light modulation array to perform the steering with a first degree of steering shift, and the processor is further configured to, based on the light modulation array scanning a region of non-interest that is a region in the external space other than the region of interest, control the light modulation array to perform the steering with a second degree of steering shift that is greater than the first degree of steering shift.

2. The beam scanning device of claim 1, wherein the first degree of steering shift is less than or equal to 0.8 times the second degree of steering shift.

3. The beam scanning device of claim 1, wherein the second degree of steering shift is proportional to a proportion of the region of interest in the external space.

4. The beam scanning device of claim 1, wherein the region of interest in the external space comprises at least one of a region containing an object or a region within a user's field of view.

5. The beam scanning device of claim 1, wherein the processor is further configured to control the light modulation array to first scan the region of interest in the external space, and scan a region of non-interest that is a region in the external space other than the region of interest subsequently to scanning the region of interest.

6. The beam scanning device of claim 1, wherein the processor is further configured to, based on a plurality of regions of interest being in the external space, control the light modulation array to cause the degree of steering shift to vary according to information associated with depths of the plurality of regions of interest.

7. The beam scanning device of claim 6, wherein the processor is further configured to control the light modulation array to cause a degree of steering shift for a first region of interest associated with small-depth information among the plurality of regions of interest to be less than a degree of steering shift for a second region of interest associated with large-depth information among the plurality of regions of interest.

8. The beam scanning device of claim 1, wherein the light modulation array is further configured to simultaneously steer the plurality of light beams in a same direction.

9. The beam scanning device of claim 1, further comprising a light source array configured to emit the plurality of light beams to the light modulation array, wherein the processor is further configured to control the light source array to cause an intensity of light for scanning the external space to vary depending on whether there is an object in the external space.

10. The beam scanning device of claim 9, wherein the processor is further configured to control the light source array to cause a light intensity for scanning a region containing an object in the external space to be less than a light intensity for scanning a region containing no object in the external space.

11. The beam scanning device of claim 9, wherein a plurality of light sources included in the light source array correspond in a one-to-one manner to a plurality of spatial light modulators included in the light modulation array.

12. The beam scanning device of claim 1, further comprising a light detector configured to detect light reflected from the external space, wherein the processor is further configured to obtain a frame comprising depth information based on using results detected by the light detector.

13. The beam scanning device of claim 12, wherein the processor is further configured to determine the region of interest in the external space based on using the frame.

14. The beam scanning device of claim 1, wherein at least one spatial light modulator of a plurality of spatial light modulators included in the light modulation array is configured to modulate, based on a sawtooth phase profile of an electronic signal applied to the at least one spatial light modulator, a phase of light.

15. A beam scanning method, comprising:

emitting a plurality of light beams to a light modulation array; and scanning an external space based on phase modulating the plurality of light beams and, in a state in which the plurality of light beams are arranged in a first direction, sequentially steering the plurality of light beams in a second direction different from the first direction, wherein, in the scanning of the external space, the external space is scanned with a degree of steering shift varying depending on whether a region of interest is determined to be located in the external space, and wherein, in the scanning of the external space, a first degree of steering shift for the region of interest in the external space is less than a second degree of steering shift for a region of non-interest that is a region in the external space other than the region of interest.

16. The beam scanning method of claim 15, wherein the second degree of steering shift is proportional to a proportion of the region of interest in the external space.

17. The beam scanning method of claim 15, wherein the region of interest in the external space comprises at least one of a region containing an object or a region within a user's field of view.

18. The beam scanning method of claim 15, wherein, in the scanning of the external space, the region of interest in the external space is first scanned, and a region of non-interest that is a region in the external space other than the region of interest is scanned subsequently to scanning the region of interest.

* * * * *